(12) United States Patent
Tsai et al.

(10) Patent No.: US 8,736,979 B2
(45) Date of Patent: May 27, 2014

(54) IMAGE LENS ASSEMBLY SYSTEM

(71) Applicant: Largan Precision Co., Ltd, Taichung (TW)

(72) Inventors: Tsung-Han Tsai, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 15 days.

(21) Appl. No.: 13/671,540

(22) Filed: Nov. 7, 2012

(65) Prior Publication Data

US 2014/0043694 A1 Feb. 13, 2014

(30) Foreign Application Priority Data

Aug. 13, 2012 (TW) .............................. 101129216 A

(51) Int. Cl.
*G02B 3/02* (2006.01)
(52) U.S. Cl.
USPC ........................................... 359/714

(58) Field of Classification Search
USPC .......................................................... 359/714
See application file for complete search history.

(56) References Cited

U.S. PATENT DOCUMENTS 7,502,181 B2 * 3/2009 Shinohara ..................... 359/764

* cited by examiner

*Primary Examiner* — James Jones
(74) *Attorney, Agent, or Firm* — CKC & Partners Co., Ltd.

(57) ABSTRACT

An image lens assembly system includes, in order from an object side to an image side, a first lens element, a second lens element, a third lens element, a fourth lens element, a fifth lens element, a sixth lens element and a seventh lens element. The first lens element with negative refractive power has a convex object-side surface. The second lens element has positive refractive power. The third lens element has refractive power. The fourth lens element has refractive power. The fifth lens element has refractive power. The sixth lens element with positive refractive power is made of plastic material, wherein at least one surface of the sixth lens element is aspheric. The seventh lens element with negative refractive power made of plastic material has a concave image-side surface changing from concave at a paraxial region to convex at a peripheral region, and at least one surface thereof is aspheric.

27 Claims, 20 Drawing Sheets

IMAGE LENS ASSEMBLY SYSTEM

RELATED APPLICATIONS

The application claims priority to Taiwan Application Serial Number 101129216, filed Aug. 13, 2012, which is herein incorporated by reference.

BACKGROUND

1. Technical Field

The present invention relates to an image lens assembly system. More particularly, the present invention relates to a compact image lens assembly system applicable to electronic products.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a five-element lens structure such as the one disclosed in U.S. Pat. No. 8,000,031. Due to the popularity of mobile products with high-end specifications, such as smart phones and PDAs (Personal Digital Assistants), the pixel and image-quality requirements of the compact optical lens system have increased rapidly. However, the conventional five-element lens structure cannot satisfy the requirements of the compact optical lens system.

Although other conventional optical lens system with six-element lens structure is disclosed, such as U.S. Publication No. 2012/0170142. However, the two lens elements of the optical lens system closest to the object side are not configured as one with negative refractive power and the other with greater positive refractive power, so that the back focal length of optical lens system cannot be reduced. As a result, when the field of view of the optical lens system is increased, the total track length thereof is getting hard to be maintained, and the aberration and the distortion thereof cannot be eliminated by the mutual compensating effect generated from the aforementioned two lens elements.

SUMMARY

According to one aspect of the present disclosure, an image lens assembly system includes, in order from an object side to an image side, a first lens element, a second lens element, a third lens element, a fourth lens element, a fifth lens element, a sixth lens element and a seventh lens element. The first lens element with negative refractive power has a convex object-side surface. The second lens element has positive refractive power. The third lens element has refractive power. The fourth lens element has refractive power. The fifth lens element has refractive power. The sixth lens element with positive refractive power is made of plastic material, wherein at least one of an object-side surface and an image-side surface of the sixth lens element is aspheric. The seventh lens element with negative refractive power made of plastic material has a concave image-side surface, wherein the image-side surface changes from concave at a paraxial region to convex at a peripheral region, and at least one of an object-side surface and the image-side surface thereof is aspheric. When a focal length of the image lens assembly system is f, a composite focal length of the first lens element and the second lens element is f12, a sum of central thicknesses from the first through seventh lens elements is $\Sigma CT$, and an axial distance between the object-side surface of the first lens element and the image-side surface of the seventh lens element is Td, the following relationships are satisfied:

$0.60 < \Sigma CT/Td < 0.90$; and $0.1 < f/f12 < 1.8$.

According to another aspect of the present disclosure, an image lens assembly system includes, in order from an object side to an image side, a first lens element, a second lens element, a third lens element, a fourth lens element, a fifth lens element, a sixth lens element and a seventh lens element. The first lens element with negative refractive power has a convex object-side surface. The second lens element has positive refractive power. The third lens element has refractive power. The fourth lens element has refractive power. The fifth lens element with refractive power has a concave object-side surface and a convex image-side surface. The sixth lens element with positive refractive power is made of plastic material, wherein at least one of an object-side surface and an image-side surface of the sixth lens element is aspheric. The seventh lens element with negative refractive power made of plastic material has a concave image-side surface, wherein the image-side surface changes from concave at a paraxial region to convex at a peripheral region, and at least one of an object-side surface and the image-side surface thereof is aspheric. When a focal length of the image lens assembly system is f, and a composite focal length of the first lens element and the second lens element is f12, the following relationship is satisfied:

$0.1 < f/f12 < 1.8$.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
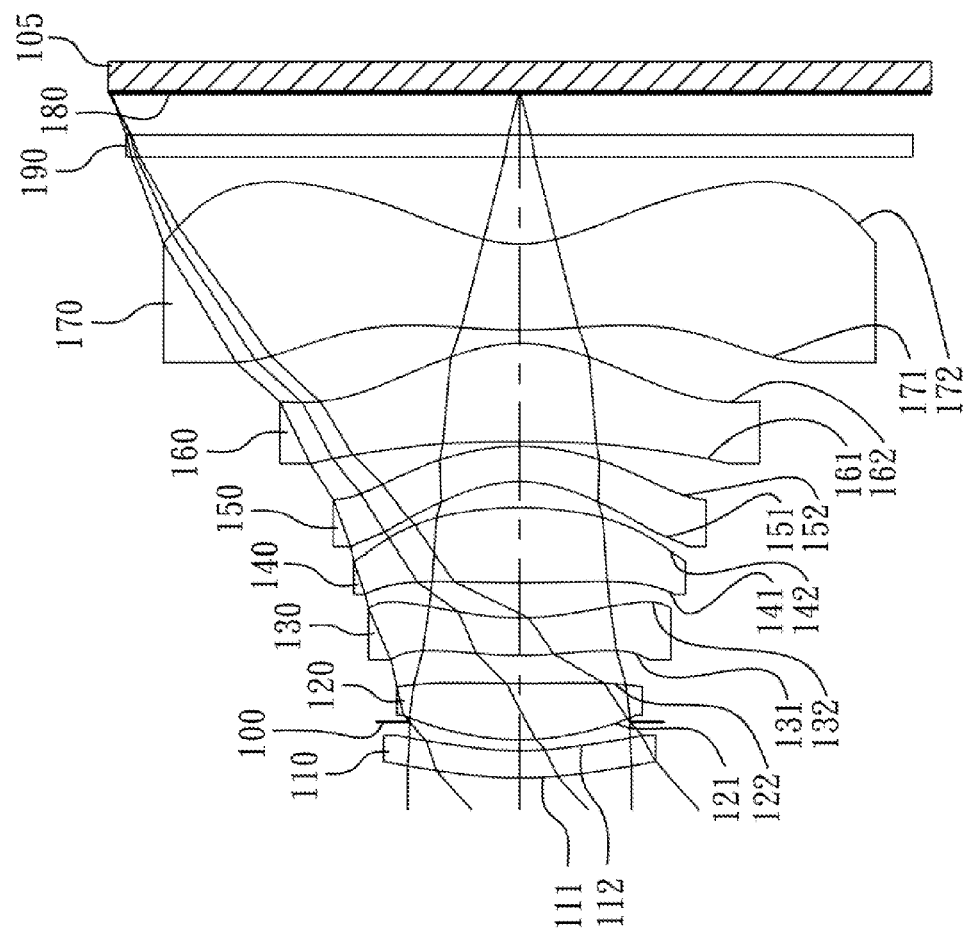
FIG. 1 is a schematic view of an image lens assembly system according to the 1st embodiment of the present disclosure.

An image lens assembly system includes, in order from an object side to an image side, a first lens element, a second lens element, a third lens element, a fourth lens element, a fifth lens element, a sixth lens element and a seventh lens element.

The first lens element with negative refractive power has a convex object-side surface, so that the field of view of the image lens assembly system can be increased by adjusting the negative refractive power and the curvature of the object-side surface of the first lens element.

The second lens element has positive refractive power, and the refractive power thereof is greater than the refractive power of the first lens element, so that the excessive back focal length of the image lens assembly system caused by the first lens element with negative refractive power can be effectively reduced. The second lens element can have a convex object-side surface, so that the aberration and the distortion of the image lens assembly system can be corrected.

The fourth lens element can have positive refractive power, so that the sensitivity of the image lens assembly system can be reduced.

The fifth lens element with refractive power can have a concave object-side surface and a convex image-side surface. Therefore, the astigmatism of the image lens assembly system can be corrected, and the resolving power thereof can be enhanced for obtaining high image quality.

The sixth lens element with positive refractive power is made of plastic material, and can have a convex image-side surface, wherein at least one of an object-side surface and the image-side surface of the sixth lens element is aspheric. Therefore, the high order aberration of the image lens assembly system can be corrected, and the resolving power thereof can be enhanced for obtaining high image quality.

The seventh lens element with negative refractive power is made of plastic material, and has a concave image-side surface, wherein the image-side surface changes from concave at a paraxial region to convex at a peripheral region, and at least one of an object-side surface and the image-side surface thereof is aspheric. Therefore, the principal point of the image lens assembly system can be positioned away from the image plane, and the back focal length thereof can be reduced so as to maintain the compact size of the image lens assembly system. Furthermore, the incident angle of the off-axis field on an image sensor can be effectively reduced for increasing the photosensing efficiency of the image sensor, and the aberration of the off-axis field can be further corrected.

When a sum of central thicknesses from the first through seventh lens elements is ΣCT, and an axial distance between the object-side surface of the first lens element and the image-side surface of the seventh lens element is Td, the following relationship is satisfied:

$$0.60 < \Sigma CT/Td < 0.90.$$

Therefore, the thicknesses of the lens elements of the image lens assembly system are proper for the manufacturing and the assembling of the lens elements, so that the yield rate of the lens elements is improved, and the total track length of the image lens assembly system can be reduced as well.

ΣCT and Td can preferably satisfy the following relationship:

$$0.70 \leq \Sigma CT/Td < 0.90.$$

When a focal length of the image lens assembly system is f, and a composite focal length of the first lens element and the second lens element is f12, the following relationship is satisfied:

$$0.1 < f/f12 < 1.8.$$

Therefore, the aberration and the distortion of the image lens assembly system can be corrected, and the back focal length thereof can be reduced so as to maintain the compact size of the image lens assembly system.

f and f12 can preferably satisfy the following relationship:

$$0.50 < f/f12 < 1.35.$$

When the axial distance between the object-side surface of the first lens element and the image-side surface of the seventh lens element is Td, the following relationship is satisfied:

$$3.2 \text{ mm} < Td < 7.0 \text{ mm}.$$

Therefore, the compact size of the image lens assembly system can be maintained.

When a curvature radius of an object-side surface of the fifth lens element is R9, and a curvature radius of an image-side surface of the fifth lens element is R10, the following relationship is satisfied:

$$|(R9-R10)/(R9+R10)| < 0.35.$$

Therefore, the astigmatism of the image lens assembly system can be corrected by adjusting the curvature of the surfaces of the fifth lens element.

When an Abbe number of the fifth lens element is V5, and an Abbe number of the sixth lens element is V6, the following relationship is satisfied:

$$0.25 < V5/V6 < 0.60.$$

Therefore, the chromatic aberration of the image lens assembly system can be corrected.

When the focal length of the image lens assembly system is f, and a focal length of the seventh lens element is f7, the following relationship is satisfied:

$$-0.70 < f7/f < -0.30.$$

Therefore, the principal point of the image lens assembly system can be positioned away from the image plane, and the back focal length of the image lens assembly system can be reduced so as to maintain the compact size of the image lens assembly system.

When a curvature radius of the object-side surface of the seventh lens element is R13, and a curvature radius of the image-side surface of the seventh lens element is R14, the following relationship is satisfied:

$$0 < R14/|R13| < 0.5.$$

Therefore, the negative refractive power of the seventh lens element is proper by adjusting the curvature radius of the object-side surface and the image-side surface thereof, so that the principal point of the image lens assembly system can be positioned away from the image plane, and the back focal length of the image lens assembly system can be reduced for maintaining the compact size of the image lens assembly system.

When a maximal field of view of the image lens assembly system is FOV, the following relationship is satisfied:

$$70 \text{ degrees} < FOV < 100 \text{ degrees}.$$

Therefore, a proper field of view is provided. When the field of view is overly enlarged, an excessive distortion of the peripheral region of the image is generated accordingly. When the field of view is too small, the photographing range is limited thereby. Therefore, the desired photographing range can be obtained while minimizing the image distortion with the proper field of view.

When the focal length of the image lens assembly system is f, and an axial distance between an image-side surface of the first lens element and the object-side surface of the second lens element is T12, the following relationship is satisfied:

$$0 < T12/f < 0.1.$$

Therefore, the assembling yield rate of the image lens assembly system is increased.

When the focal length of the image lens assembly system is f, a focal length of the second lens element is f2, and a focal length of the fourth lens element is f4, the following relationship is satisfied:

$$1.4 < f/f2 + f/f4 < 2.6.$$

Therefore, the back focal length of the image lens assembly system can be reduced, the aberration and the distortion of the image lens assembly system can be corrected, and the sensitivity of the image lens assembly system can also be reduced.

When the focal length of the image lens assembly system is f, a focal length of the first lens element is f1, the focal length of the second lens element is f2, a focal length of the third lens element is f3, the focal length of the fourth lens element is f4, and a focal length of the fifth lens element is f5, the following relationship is satisfied:

$$|f/f2| > f/fi, \text{ wherein } i=1, 3, 4, 5.$$

Therefore, the second lens element has the greatest refractive power for reducing the back focal length of the image lens assembly system for maintaining the compact size of the image lens assembly system.

When an axial distance between the object-side surface of the first lens element and an image plane is TTL, and a maximum image height of the image lens assembly system is ImgH, the following relationship is satisfied:

$$TTL/ImgH < 1.85.$$

Therefore, the compact size of the image lens assembly system can be maintained for applying to thin and portable electronics.

According to the image lens assembly system of the present disclosure, the lens elements thereof can be made of plastic or glass material. When the lens elements are made of glass material, the distribution of the refractive power of the image lens assembly system may be more flexible to design. When the lens elements are made of plastic material, the manufacturing costs can be effectively reduced. Furthermore, the surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the image lens assembly system can also be reduced.

According to the image lens assembly system of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the paraxial region of the surface is convex; when the lens element has a concave surface, it indicates that the paraxial region of the surface is concave.

According to the image lens assembly system of the present disclosure, the image lens assembly system can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop disposed between an object and the first lens element provides a longer distance from an exit pupil of the system to an image plane and thereby the generated telecentric effect improves the image-sensing efficiency of an image sensor. A middle stop disposed between the first lens element and the image plane is favorable for enlarging the field of view of the image lens assembly system and thereby provides a wider field of view for the same.

According to the image lens assembly system of the present disclosure, the image lens assembly system is featured with good correcting ability and high image quality, and can be applied to 3D (three-dimensional) image capturing applications, in products such as digital cameras, mobile devices and tablets.

According to the above description of the present disclosure, the following 1st-10th specific embodiments are provided for further explanation.

1st Embodiment

Figure 2:
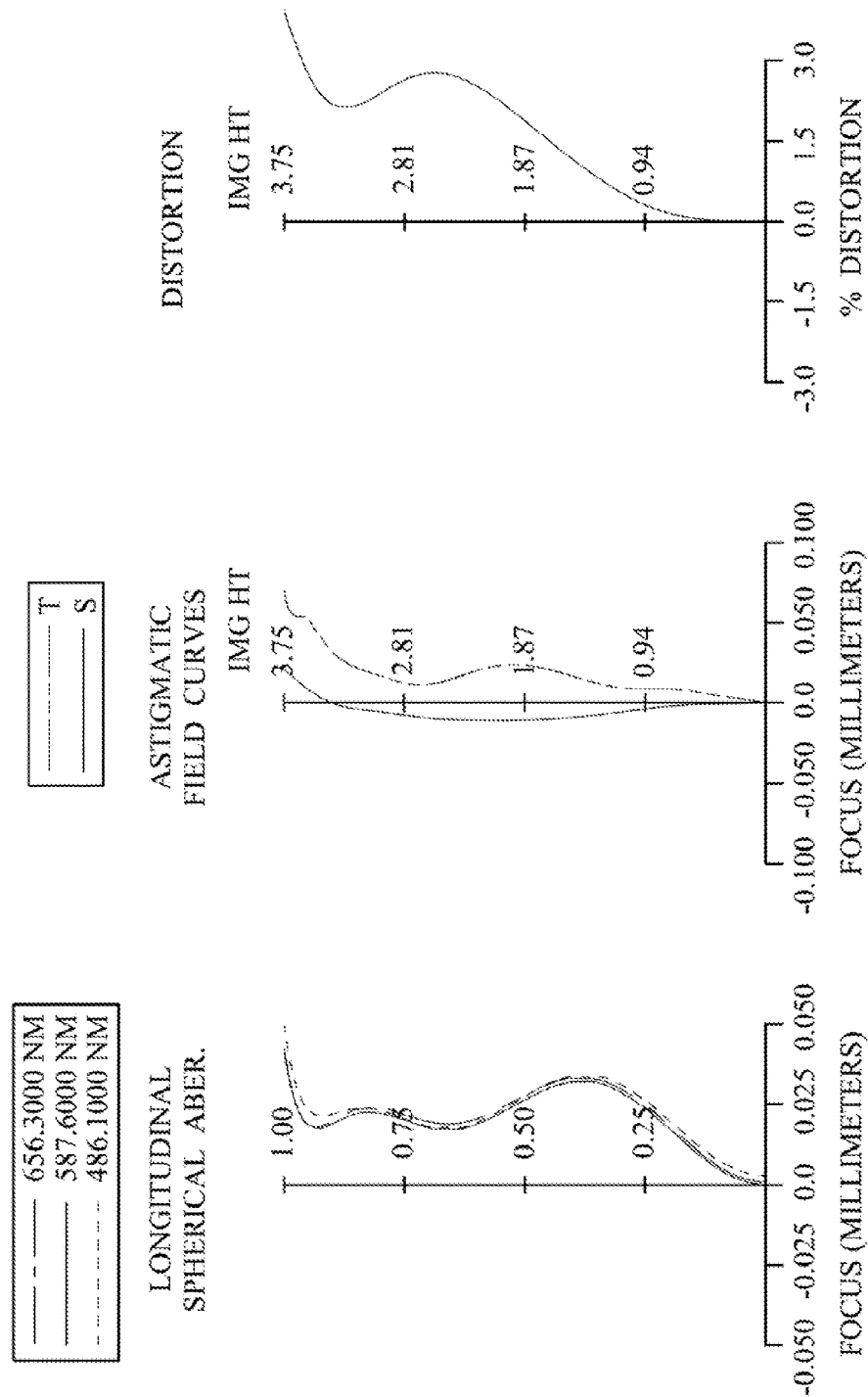
FIG. 2 shows spherical aberration curves, astigmatic field curves and a distortion curve of the image lens assembly system according to the 1st embodiment.

FIG. 1 is a schematic view of an image lens assembly system according to the 1st embodiment of the present disclosure. FIG. 2 shows spherical aberration curves, astigmatic field curves and a distortion curve of the image lens assembly system according to the 1st embodiment. In FIG. 1, the image lens assembly system includes, in order from an object side to an image side, a first lens element 110, an aperture stop 100, a second lens element 120, a third lens element 130, a fourth lens element 140, a fifth lens element 150, a sixth lens element 160, a seventh lens element 170, an IR-cut filter 190, an image plane 180, and an image sensor 105.

The first lens element 110 made of plastic material has negative refractive power. The first lens element 110 has a convex object-side surface 111 and a concave image-side surface 112, and both the object-side surface 111 and the image-side surface 112 thereof are aspheric.

The second lens element 120 made of plastic material has positive refractive power. The second lens element 120 has a convex object-side surface 121 and a concave image-side surface 122, and both the object-side surface 121 and the image-side surface 122 thereof are aspheric.

The third lens element 130 made of plastic material has negative refractive power. The third lens element 130 has a convex object-side surface 131 changing from convex at a paraxial region to concave at a peripheral region, and has a concave image-side surface 132 changing from concave at a paraxial region to convex at a peripheral region. Both the object-side surface 131 and the image-side surface 132 of the third lens element 130 are aspheric.

The fourth lens element 140 made of plastic material has positive refractive power. The fourth lens element 140 has a convex object-side surface 141 changing from convex at a paraxial region to concave at a peripheral region, and has a convex image-side surface 142 changing from convex at a paraxial region to concave at a peripheral region. Both the object-side surface 141 and the image-side surface 142 of the fourth lens element 140 are aspheric.

The fifth lens element 150 made of plastic material has negative refractive power. The fifth lens element 150 has a concave object-side surface 151 and a convex image-side surface 152, and both the object-side surface 151 and the image-side surface 152 thereof are aspheric.

The sixth lens element 160 made of plastic material has positive refractive power. The sixth lens element 160 has a concave object-side surface 161 and a convex image-side surface 162, and both the object-side surface 161 and the image-side surface 162 thereof are aspheric.

The seventh lens element 170 made of plastic material has negative refractive power. The seventh lens element 170 has a convex object-side surface 171, and has a concave image-side surface 172 changing from concave at a paraxial region to convex at a peripheral region. Both the object-side surface 171 and the image-side surface 172 of the seventh lens element 170 are aspheric.

The IR-cut filter 190 made of glass material is located between the seventh lens element 170 and the image plane 180, and will not affect a focal length of the image lens assembly system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the image lens assembly system according to the 1st embodiment, when the focal length of the image lens assembly system is f, an f-number of the image lens assembly system is Fno, and half of a maximal field of view of the image lens assembly system is HFOV, these parameters have the following values:

$f$=4.10 mm;

Fno=2.00; and

HFOV=41.2 degrees.

In the image lens assembly system according to the 1st embodiment, when an Abbe number of the fifth lens element 150 is V5, and an Abbe number of the sixth lens element 160 is V6, the following relationship is satisfied:

$V5/V6$=0.42.

In the image lens assembly system according to the 1st embodiment, when the focal length of the image lens assembly system is f, and an axial distance between the image-side surface 112 of the first lens element 110 and the object-side surface 121 of the second lens element 120 is T12, the following relationship is satisfied:

$T12/f$=0.024.

In the image lens assembly system according to the 1st embodiment, when a curvature radius of the object-side surface 151 of the fifth lens element 150 is R9, and a curvature radius of the image-side surface 152 of the fifth lens element 150 is R10, the following relationship is satisfied:

$|(R9-R10)/(R9+R10)|$=0.24.

In the image lens assembly system according to the 1st embodiment, when a curvature radius of the object-side surface 171 of the seventh lens element 170 is R13, and a curvature radius of the image-side surface 172 of the seventh lens element 170 is R14, the following relationship is satisfied:

$R14/|R13|$=0.19.

In the image lens assembly system according to the 1st embodiment, when the focal length of the image lens assembly system is f, and a focal length of the seventh lens element 170 is f7, the following relationship is satisfied:

$f7/f$=−0.65.

In the image lens assembly system according to the 1st embodiment, when the focal length of the image lens assembly system is f, and a composite focal length of the first lens element 110 and the second lens element 120 is f12, the following relationship is satisfied:

$f/f12$=0.71.

In the image lens assembly system according to the 1st embodiment, when the focal length of the image lens assembly system is f, a focal length of the second lens element 120 is f2, and a focal length of the fourth lens element 140 is f4, the following relationship is satisfied:

$f/f2+f/f4$=1.75.

In the image lens assembly system according to the 1st embodiment, when an axial distance between the object-side surface 111 of the first lens element 110 and the image-side surface 172 of the seventh lens element 170 is Td, the parameter has the following value:

$Td$=4.892 mm.

In the image lens assembly system according to the 1st embodiment, when a sum of central thicknesses from the first 110 through seventh 170 lens elements is ΣCT, and the axial distance between the object-side surface 111 of the first lens element 110 and the image-side surface 172 of the seventh lens element 170 is Td, the following relationship is satisfied:

ΣCT/$Td$=0.78.

In the image lens assembly system according to the 1st embodiment, when an axial distance between the object-side surface 111 of the first lens element 110 and the image plane 180 is TTL, and a maximum image height of the image lens assembly system is ImgH which here is a half of the diagonal length of the photosensitive area of the image sensor 105 on the image plane 180, the following relationship is satisfied:

TTL/ImgH=1.66.

In the image lens assembly system according to the 1st embodiment, when the maximal field of view of the image lens assembly system is FOV, the parameter has the following value:

FOV=82.4 degrees.

The detailed optical data of the 1st embodiment are shown in Table 1, and the aspheric surface data are shown in Table 2 below.

TABLE 1

1st Embodiment
f = 4.10 mm, Fno = 2.00, HFOV = 41.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 3.790200 | (ASP) | 0.250 | Plastic | 1.640 | 23.3 | −26.92 |
| 2 | | 3.026600 | (ASP) | 0.263 | | | | |
| 3 | Ape. Stop | Plano | | −0.164 | | | | |
| 4 | Lens 2 | 2.253530 | (ASP) | 0.518 | Plastic | 1.544 | 55.9 | 4.63 |
| 5 | | 19.505900 | (ASP) | 0.252 | | | | |
| 6 | Lens | 3.612500 | (ASP) | 0.347 | Plastic | 1.640 | 23.3 | −12.97 |
| 7 | | 2.422750 | (ASP) | 0.324 | | | | |
| 8 | Lens 4 | 12.756700 | (ASP) | 0.687 | Plastic | 1.544 | 55.9 | 4.72 |
| 9 | | −3.157000 | (ASP) | 0.239 | | | | |
| 10 | Lens 5 | −1.193500 | (ASP) | 0.325 | Plastic | 1.640 | 23.3 | −5.71 |
| 11 | | −1.961460 | (ASP) | 0.040 | | | | |
| 12 | Lens 6 | −29.239800 | (ASP) | 0.904 | Plastic | 1.544 | 55.9 | 2.64 |
| 13 | | −1.383730 | (ASP) | 0.120 | | | | |
| 14 | Leas 7 | 5.726300 | (ASP) | 0.787 | Plastic | 1.544 | 55.9 | −2.68 |
| 15 | | 1.106930 | (ASP) | 0.800 | | | | |
| 16 | IR-cut filter | Plano | | 0.200 | Glass | 1.516 | 64.1 | — |
| 17 | | Plano | | 0.391 | | | | |
| 18 | Image | Plano | | — | | | | |

Note:
Reference wavelength (d-line) is 587.6 nm.

TABLE 2

Aspheric Coefficients

| Surface # | 1 | 2 | 4 | 5 | 6 | 7 | 8 |
|---|---|---|---|---|---|---|---|
| k = | −9.79391E+00 | −1.38249E+01 | −5.08567E+00 | −1.00000E+00 | −1.19248E+01 | −2.90099E+00 | −1.00000E+00 |
| A4 = | −9.62346E−03 | −2.47259E−02 | −1.32963E−02 | −4.51199E−02 | −1.09132E−01 | −8.79236E−02 | −3.03992E−02 |
| A6 = | 1.17735E−03 | 1.11101E−02 | 5.66935E−02 | 1.16181E−02 | 7.18362E−02 | 4.98763E−02 | −1.21714E−02 |
| A8 = | −3.13554E−03 | −7.61782E−03 | −7.01354E−02 | 8.75234E−03 | −8.03921E−02 | −2.61518E−02 | 9.61434E−03 |
| A10 = | 1.22476E−03 | 4.48759E−03 | 3.75293E−02 | −2.76377E−02 | 4.48995E−02 | 9.31836E−03 | −3.67113E−03 |
| A12 = | 4.03615E−04 | 1.39428E−03 | 7.43850E−03 | 1.62663E−02 | −9.55288E−03 | −4.22028E−03 | −1.42105E−03 |
| A14 = | | | −8.65285E−03 | −3.05263E−03 | −4.34520E−03 | 3.14527E−04 | 6.83756E−04 |

| Surface # | 9 | 10 | 11 | 12 | 13 | 14 | 15 |
|---|---|---|---|---|---|---|---|
| k = | −4.89645E+00 | −1.57567E+00 | −1.41741E+00 | −1.00000E+00 | −4.62220E+00 | −4.85293E+00 | −4.73581E+00 |
| A4 = | −1.36966E−02 | 1.30143E−01 | 4.18466E−02 | −4.92718E−02 | −6.97143E−03 | −5.14983E−02 | −2.34065E−02 |
| A6 = | −2.73105E−02 | −1.44369E−01 | −4.44469E−02 | 2.66614E−02 | −2.64015E−03 | 7.02809E−03 | 3.81829E−03 |
| A8 = | 5.51112E−03 | 9.38999E−02 | 2.77053E−02 | −6.87108E−03 | 8.80797E−03 | −4.86238E−04 | −5.08531E−04 |
| A10 = | 5.25437E−04 | −3.72021E−02 | −9.83514E−03 | 7.77709E−04 | −3.34439E−03 | 2.53995E−05 | 4.10183E−05 |
| A12 = | 2.29360E−04 | 1.16608E−02 | 2.53503E−03 | −6.17588E−06 | 5.23018E−04 | 3.74772E−06 | −2.66767E−06 |
| A14 = | −4.59259E−06 | −1.06321E−03 | −3.03950E−04 | −5.34594E−06 | −3.07705E−05 | −4.98328E−07 | 9.29312E−08 |

In Table 1, the curvature radius, the thickness and the focal length are shown in millimeters (mm). Surface numbers 0-18 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

2nd Embodiment

Figure 3:
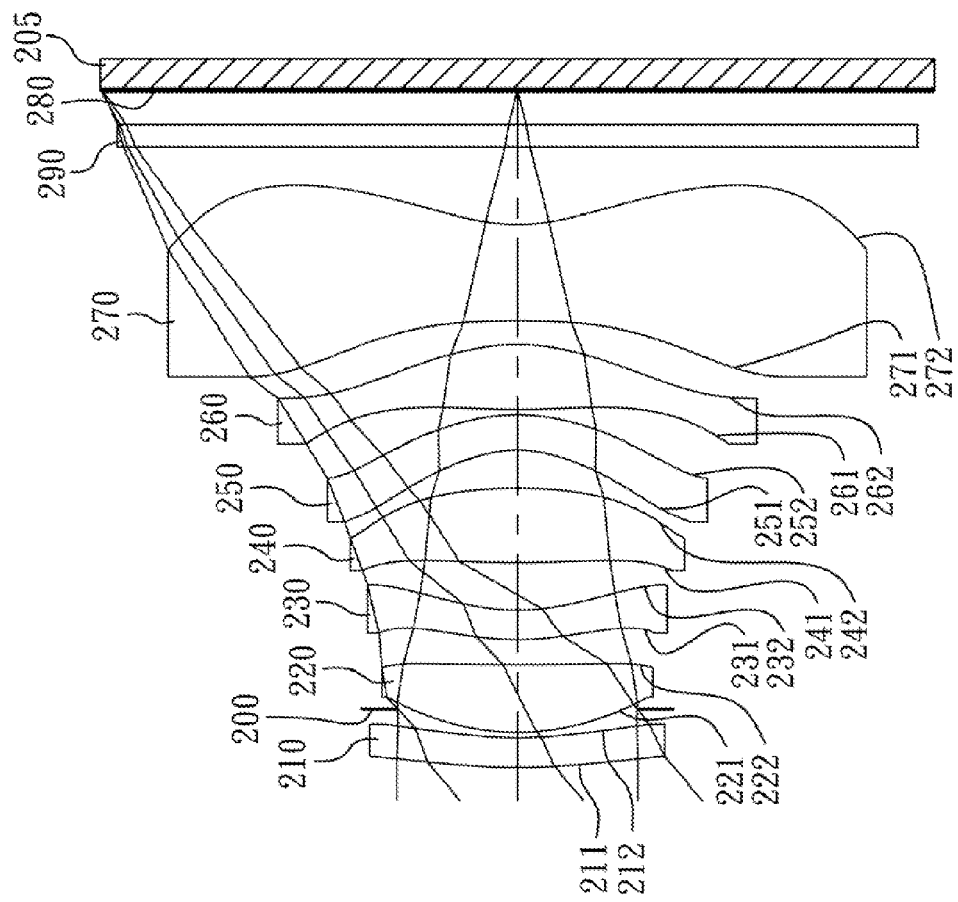
FIG. 3 is a schematic view of an image lens assembly system according to the 2nd embodiment of the present disclosure.
Figure 4:
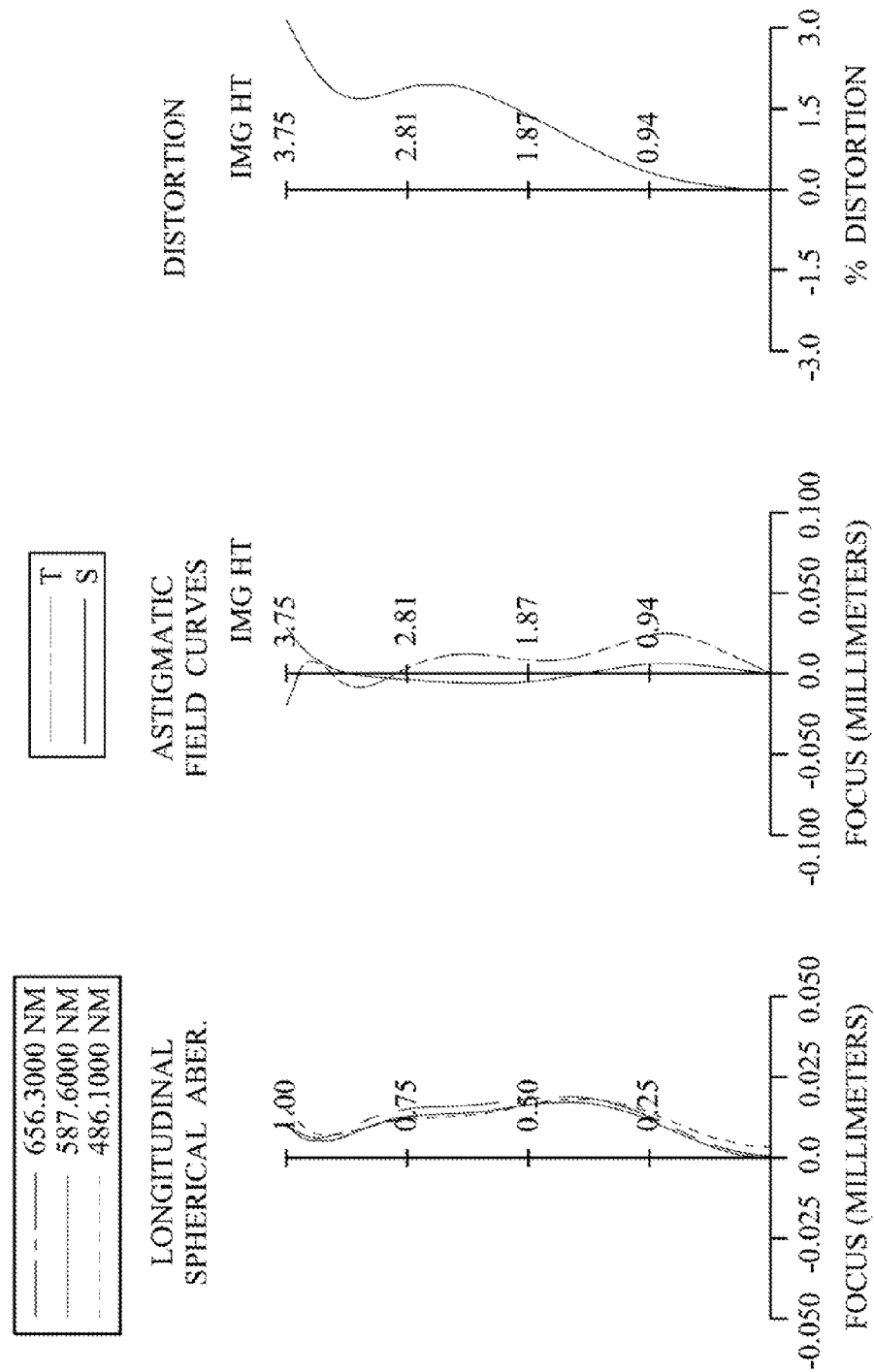
FIG. 4 shows spherical aberration curves, astigmatic field curves and a distortion curve of the image lens assembly system according to the 2nd embodiment.

FIG. 3 is a schematic view of an image lens assembly system according to the 2nd embodiment of the present disclosure. FIG. 4 shows spherical aberration curves, astigmatic field curves and a distortion curve of the image lens assembly system according to the 2nd embodiment. In FIG. 3, the image lens assembly system includes, in order from an object side to an image side, a first lens element 210, an aperture stop 200, a second lens element 220, a third lens element 230, a fourth lens element 240, a fifth lens element 250, a sixth lens element 260, a seventh lens element 270, an IR-cut filter 290, an image plane 280, and an image sensor 205.

The first lens element 210 made of plastic material has negative refractive power. The first lens element 210 has a convex object-side surface 211 and a concave image-side surface 212, and both the object-side surface 211 and the image-side surface 212 thereof are aspheric.

The second lens element 220 made of plastic material has positive refractive power. The second lens element 220 has a convex object-side surface 221 and a concave image-side surface 222, and both the object-side surface 221 and the image-side surface 222 thereof are aspheric.

The third lens element 230 made of plastic material has negative refractive power. The third lens element 230 has a convex object-side surface 231 changing from convex at a paraxial region to concave at a peripheral region, and has a concave image-side surface 232 changing from concave at a paraxial region to convex at a peripheral region. Both the object-side surface 231 and the image-side surface 232 of the third lens element 230 are aspheric.

The fourth lens element 240 made of plastic material has positive refractive power. The fourth lens element 240 has a convex object-side surface 241 changing from convex at a paraxial region to concave at a peripheral region, and has a convex image-side surface 242 changing from convex at a paraxial region to concave at a peripheral region. Both the object-side surface 241 and the image-side surface 242 of the fourth lens element 240 are aspheric.

The fifth lens element 250 made of plastic material has negative refractive power. The fifth lens element 250 has a concave object-side surface 251 and a convex image-side surface 252, and both the object-side surface 251 and the image-side surface 252 thereof are aspheric.

The sixth lens element 260 made of plastic material has positive refractive power. The sixth lens element 260 has a convex object-side surface 261 and a convex image-side surface 262, and both the object-side surface 261 and the image-side surface 262 thereof are aspheric.

The seventh lens element 270 made of plastic material has negative refractive power. The seventh lens element 270 has a concave object-side surface 271, and has a concave image-side surface 272 changing from concave at a paraxial region to convex at a peripheral region. Both the object-side surface 271 and the image-side surface 272 of the seventh lens element 270 are aspheric.

The IR-cut filter 290 made of glass material is located between the seventh lens element 270 and the image plane 280, and will not affect a focal length of the image lens assembly system.

The detailed optical data of the 2nd embodiment are shown in Table 3, and the aspheric surface data are shown in Table 4 below.

TABLE 3

2nd Embodiment
f = 4.34 mm, Fno = 2.00, HFOV = 39.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 5.000400 | (ASP) | 0.267 | Plastic | 1.640 | 23.3 | −15.95 |
| 2 | | 3.286300 | (ASP) | 0.262 | | | | |
| 3 | Ape, Stop | Plano | | −0.212 | | | | |
| 4 | Lens 2 | 2.085680 | (ASP) | 0.605 | Plastic | 1.544 | 55.9 | 4.15 |
| 5 | | 24.189600 | (ASP) | 0.225 | | | | |
| 6 | Lens 3 | 2.338000 | (ASP) | 0.270 | Plastic | 1.640 | 23.3 | −17.88 |
| 7 | | 9.853790 | (ASP) | 0.430 | | | | |
| 8 | Lens 4 | 10.370200 | (ASP) | 0.669 | Plastic | 1.544 | 55.9 | 5.62 |
| 9 | | −4.239600 | (ASP) | 0.343 | | | | |
| 10 | Lens 5 | −1.123950 | (ASP) | 0.312 | Plastic | 1 640 | 23.3 | −5.72 |
| 11 | | −1.797230 | (ASP) | 0.050 | | | | |
| 12 | Lens 6 | 6.692000 | (ASP) | 0.591 | Plastic | 1.535 | 56.3 | 2.65 |
| 13 | | −1.743020 | (ASP) | 0.208 | | | | |
| 14 | Lens 7 | −8.571200 | (ASP) | 13.870 | Plastic | 1.535 | 56.3 | −2.47 |
| 15 | | 1.614740 | (ASP) | 0.700 | | | | |
| 16 | IR-cut filter | Plano | | 0.200 | Glass | 1.516 | 64.1 | — |
| 17 | | Plano | | 0.312 | | | | |
| 18 | Image | Plano | | — | | | | |

Note:
Reference wavelength (d-line) is 587.6 nm.

TABLE 4

Aspheric Coefficients

| Surface # | 1 | 2 | 4 | 5 | 6 | 7 | 8 |
|---|---|---|---|---|---|---|---|
| k = | −1.88822E+01 | −1.99587E+01 | −3.39052E+00 | −1.00000E+00 | −3.38341E+00 | −3.23623E+00 | −1.00000E+00 |
| A4 = | −2.05662E−02 | −3.06678E−02 | −1.19377E−02 | −2.19227E−02 | −1.18247E−01 | −7.87347E−02 | −2.63338E−02 |
| A6 = | 3.33322E−03 | 1.54661E−02 | 6.25126E−02 | 2.52136E−02 | 7.25706E−02 | 4.92939E−02 | −1.03501E−02 |
| A8 = | 6.92096E−04 | −7.82046E−03 | −5.68640E−02 | −8.03234E−02 | 6.57740E−02 | −2.91904E−02 | 6.93688E−03 |
| A10 = | 1.46409E−03 | 5.58844E−03 | 2.94485E−02 | −2.66862E−02 | 3.75162E−02 | 1.00812E−02 | −3.52315E−03 |
| A12 = | −3.52848E−04 | −1.19318E−03 | −5.33189E−03 | 2.45491E−02 | −1.74387E−02 | −3.33547E−03 | −8.44741E−04 |
| A14 = | | | −1.19682E−03 | −7.62808E−03 | 3.17469E−03 | 5.16458E−04 | 4.91546E−04 |

| Surface # | 9 | 10 | 11 | 12 | 13 | 14 | 15 |
|---|---|---|---|---|---|---|---|
| k = | −3.20247E−01 | −1.69142E+00 | −1.28637E+00 | −1.00000E+00 | −7.19242E+00 | −1.89184E+01 | −7.67113E+00 |
| A4 = | −2.11376E−02 | 1.27414E−01 | 4.38410E−02 | −8.75369E−02 | −1.58920E−02 | −4.40178E−02 | −2.15024E−02 |
| A6 = | −2.07430E−02 | −1.46717E−01 | −4.33653E−02 | 2.92389E−02 | −2.36127E−03 | 8.86032E−03 | 3.48346E−03 |
| A8 = | 3.79361E−03 | 9.27011E−02 | 2.70102E−02 | −7.75804E−03 | 8.86321E−03 | −4.08014E−04 | −5.16814E−04 |
| A10 = | −2.46990E−04 | −3.75321E−02 | −9.99710E−03 | 7.24668E−04 | −3.32322E−03 | 3.70251E−06 | 4.48650E−05 |
| A12 = | 1.50710E−04 | 1.17194E−02 | 2.52409E−03 | 4.83313E−05 | 5.24353E−04 | 7.68168E−07 | −3.00049E−06 |
| A14 = | 1.92558E−04 | −1.81681E−03 | −2.76705E−04 | −5.83671E−06 | −3.18620E−05 | −3.39695E−07 | 1.09430E−07 |

In the image lens assembly system according to the 2nd embodiment, the definitions of f, f12, f2, f4, f7, Fno, FOV, HFOV, V5, V6, R9, R10, R13, R14, ΣCT, T12, Td, TTL, and ImgH are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 4.34 | f7/f | −0.57 |
| Fno | 2.00 | f/f12 | 0.75 |
| HFOV (deg.) | 39.9 | f/f2 + f/f4 | 1.82 |
| V5/V6 | 0.41 | Td (mm) | 4.890 |
| T12/f | 0.012 | ΣCT/Td | 0.73 |
| |(R9 − R10)/(R9 + R10)| | 0.23 | TTL/ImgH | 1.61 |
| R14/|R13| | 0.19 | FOV (deg.) | 79.8 |

3rd Embodiment

Figure 5:
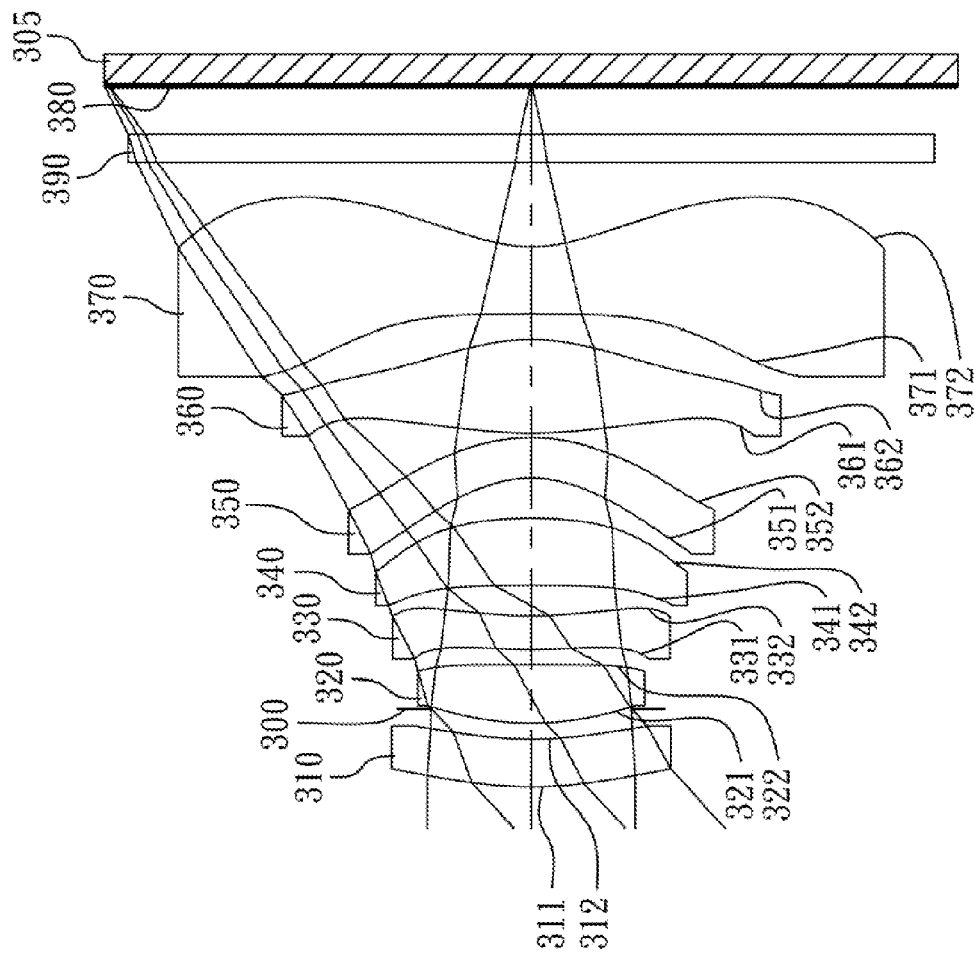
FIG. 5 is a schematic view of an image lens assembly system according to the 3rd embodiment of the present disclosure.
Figure 6:
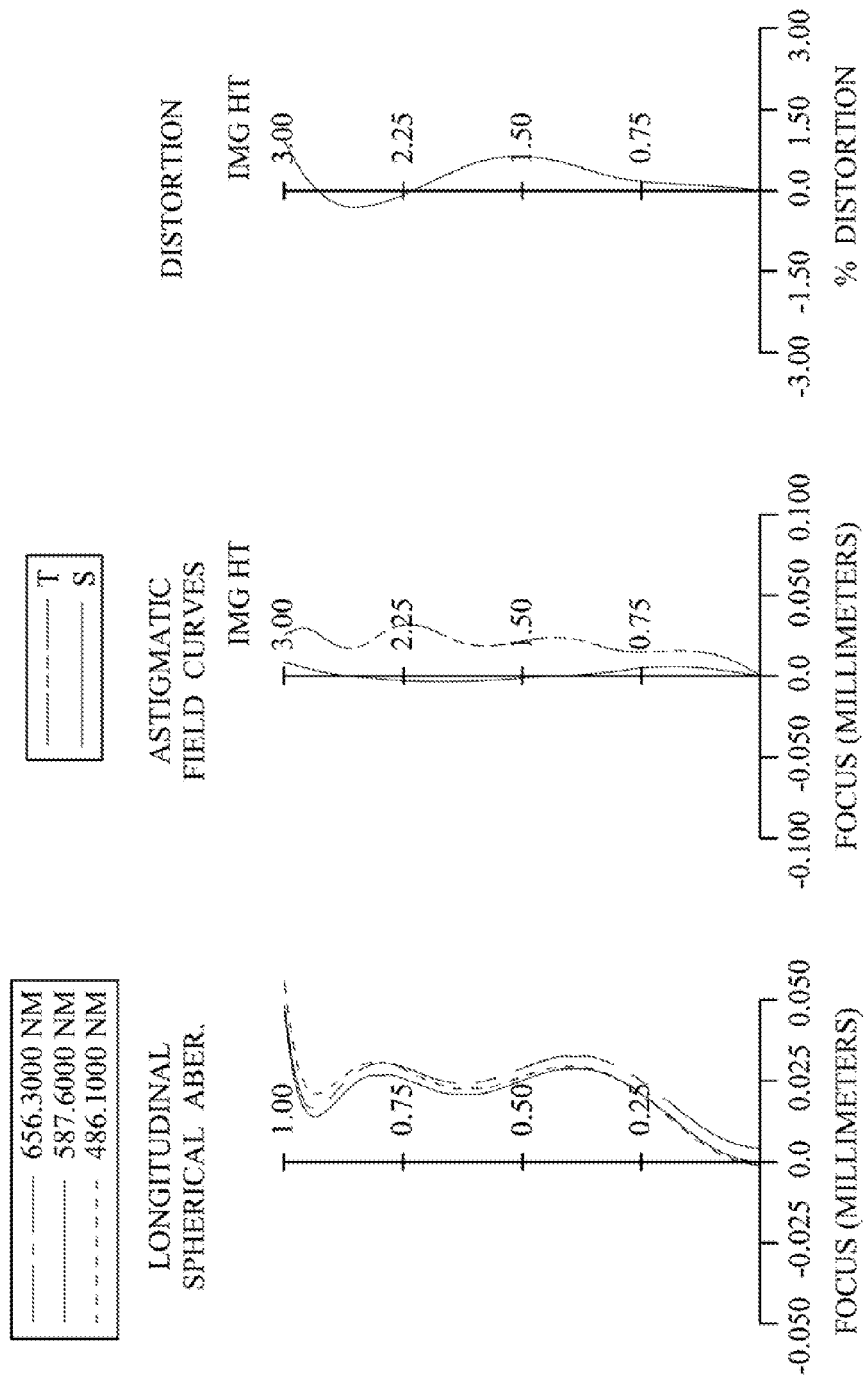
FIG. 6 shows spherical aberration curves, astigmatic field curves and a distortion curve of the image lens assembly system according to the 3rd embodiment.

FIG. 5 is a schematic view of an image lens assembly system according to the 3rd embodiment of the present disclosure. FIG. 6 shows spherical aberration curves, astigmatic field curves and a distortion curve of the image lens assembly system according to the 3rd embodiment. In FIG. 5, the image lens assembly system includes, in order from an object side to an image side, a first lens element 310, an aperture stop 300, a second lens element 320, a third lens element 330, a fourth lens element 340, a fifth lens element 350, a sixth lens element 360, a seventh lens element 370, an IR-cut filter 390, an image plane 380, and an image sensor 305.

The first lens element 310 made of plastic material has negative refractive power. The first lens element 310 has a convex object-side surface 311 and a concave image-side surface 312, and both the object-side surface 311 and the image-side surface 312 thereof are aspheric.

The second lens element 320 made of plastic material has positive refractive power. The second lens element 320 has a convex object-side surface 321 and a concave image-side surface 322, and both the object-side surface 321 and the image-side surface 322 thereof are aspheric.

The third lens element 330 made of plastic material has negative refractive power. The third lens element 330 has a convex object-side surface 331 changing from convex at a paraxial region to concave at a peripheral region, and has a concave image-side surface 332 changing from concave at a paraxial region to convex at a peripheral region. Both the object-side surface 331 and the image-side surface 332 of the third lens element 330 are aspheric.

The fourth lens element 340 made of plastic material has positive refractive power. The fourth lens element 340 has a concave object-side surface 341 changing from concave at a paraxial region to convex at a peripheral region, and has a convex image-side surface 342 changing from convex at a paraxial region to concave at a peripheral region. Both the object-side surface 341 and the image-side surface 342 of the fourth lens element 340 are aspheric.

The fifth lens element 350 made of plastic material has negative refractive power. The fifth lens element 350 has a concave object-side surface 351 and a convex image-side surface 352, and both the object-side surface 351 and the image-side surface 352 thereof are aspheric.

The sixth lens element 360 made of plastic material has positive refractive power. The sixth lens element 360 has a convex object-side surface 361 and a convex image-side surface 362, and both the object-side surface 361 and the image-side surface 362 thereof are aspheric.

The seventh lens element 370 made of plastic material has negative refractive power. The seventh lens element 370 has a planar object-side surface 371, and has a concave image-side surface 372 changing from concave at a paraxial region to convex at a peripheral region. Both the object-side surface 371 and the image-side surface 372 of the seventh lens element 370 are aspheric.

The IR-cut filter 390 made of glass material is located between the seventh lens element 370 and the image plane 380, and will not affect a focal length of the image lens assembly system.

The detailed optical data of the 3rd embodiment are shown in Table 5, and the aspheric surface data are shown in Table 6 below.

TABLE 5

3rd Embodiment
f = 3.24 mm, Fno = 2.20, HFOV = 42.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.894680 | (ASP) | 0.338 | Plastic | 1.640 | 23.3 | −57.09 |
| 2 | | 2.559930 | (ASP) | 0.216 | | | | |
| 3 | Ape. Stop | Plano | | −0.102 | | | | |
| 4 | Lens 2 | 1.985760 | (ASP) | 0.411 | Plastic | 1.544 | 65.9 | 3.89 |
| 5 | | 29.337600 | (ASP) | 0.110 | | | | |
| 6 | Lens 3 | 4.409400 | (ASP) | 0.240 | Plastic | 1.650 | 21.4 | −13.12 |
| 7 | | 2.843750 | (ASP) | 0.217 | | | | |
| 8 | Lens 4 | −35.383200 | (ASP) | 0.476 | Plastic | 1.544 | 55.9 | 5.38 |
| 9 | | −2.718940 | (ASP) | 0.287 | | | | |
| 10 | Lens 5 | −0.814300 | (ASP) | 0.283 | Plastic | 1.650 | 21.4 | −4.43 |
| 11 | | −1.291360 | (ASP) | 0.030 | | | | |
| 12 | Lens 6 | 2.900410 | (ASP) | 0.671 | Plastic | 1.544 | 55.9 | 1.78 |
| 13 | | −1.335940 | (ASP) | 0.175 | | | | |
| 14 | Lens 7 | ∞ | (ASP) | 0.481 | Plastic | 1.535 | 56.3 | −1.80 |
| 15 | | 0.9646713 | (ASP) | 0.600 | | | | |
| 16 | IR-cut filter | Plano | | 0.200 | Glass | 1.516 | 64.1 | — |
| 17 | | Plano | | 0.342 | | | | |
| 18 | Image | Plano | | — | | | | |

Note:
Reference wavelength (d-line) is 587.6 nm.

TABLE 6

Aspheric Coefficients

| Surface # | 1 | 2 | 4 | 5 | 6 | 7 | 8 |
|---|---|---|---|---|---|---|---|
| k = | −6.44620E+00 | −1.03793E+01 | −5.08519E+00 | 2.67765E+00 | −3.14294E+01 | −9.30969E−01 | 3.00000E+00 |
| A4 = | −1.56694E−02 | −5.41895E−02 | −2.85410E−02 | −1.46250E−01 | −2.64687E−01 | −1.95465E−01 | −1.20782E−01 |
| A6 = | 8.62105E−04 | 3.05195E−02 | 2.29569E−01 | 5.73111E−02 | 3.18828E−01 | 1.88573E−01 | −4.42803E−02 |
| A8 = | −1.71870E−02 | −5.97881E−02 | −6.68341E−01 | 1.46406E−01 | −6.74733E−01 | −1.83060E−01 | 8.86399E−02 |
| A10 = | 6.20470E−03 | 7.86645E−02 | 6.32519E−01 | −4.74491E−01 | 6.09816E−01 | 9.65919E−02 | −5.43961E−02 |
| A12 = | 3.54602E−03 | −1.47308E−10 | 9.49563E−01 | 3.13487E−01 | 6.72829E−03 | −1.44797E−01 | −4.33372E−02 |
| A14 = | | | −1.47630E+00 | −1.39652E−01 | −7.80642E−01 | 4.53123E−02 | 5.09685E−02 |

| Surface # | 9 | 10 | 11 | 12 | 13 | 14 | 15 |
|---|---|---|---|---|---|---|---|
| k = | 7.51760E−01 | −1.69890E+00 | −1.53370E+00 | −3.21641E+00 | −8.49803E+00 | 5.00000E+00 | −5.75493E+00 |
| A4 = | −7.31012E−02 | 2.87498E−01 | 9.98483E−02 | −1.37547E−01 | 9.45821E−03 | −1.11584E−01 | −5.40248E−02 |
| A6 = | −8.72535E−02 | −6.30785E−01 | −1.95914E−01 | 1.12017E−01 | −2.40883E−02 | 3.01383E−02 | 1.52886E−02 |
| A8 = | 3.57762E−02 | 7.00692E−01 | 1.99956E−01 | −5.03326E−02 | 6.33591E−02 | −3.80918E−03 | −3.71527E−03 |
| A10 = | 2.91774E−03 | −4.93787E−01 | −1.33804E−01 | 8.37951E−03 | −4.48417E−02 | 3.55656E−04 | 5.56196E−04 |
| A12 = | 9.81419E−03 | 2.77554E−01 | 6.01517E−02 | −8.64107E−04 | 1.24302E−02 | 9.70251E−05 | −4.88335E−05 |
| A14 = | 3.40623E−03 | −8.36280E−02 | −1.15447E−02 | 1.17849E−04 | −1.20879E−03 | −2.34195E−05 | 1.83940E−06 |

In the image lens assembly system according to the 3rd embodiment, the definitions of f, f12, f2, f4, f7, Fno, FOV, HFOV, V5, V6, R9, R10, R13, R14, ΣCT, T12, Td, TTL, and ImgH are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 3.24 | f7/f | −0.56 |
| Fno | 2.20 | f/f12 | 0.74 |
| HFOV (deg.) | 42.4 | f/f2 + f/f4 | 1.44 |
| V5/V6 | 0.38 | Td (mm) | 3.833 |
| T12/f | 0.035 | ΣCT/Td | 0.76 |
| |(R9 − R10)/(R9 + R10)| | 0.23 | TTL/ImgH | 1.64 |
| R14/|R13| | 0.00 | FOV (deg.) | 84.8 |

4th Embodiment

Figure 7:
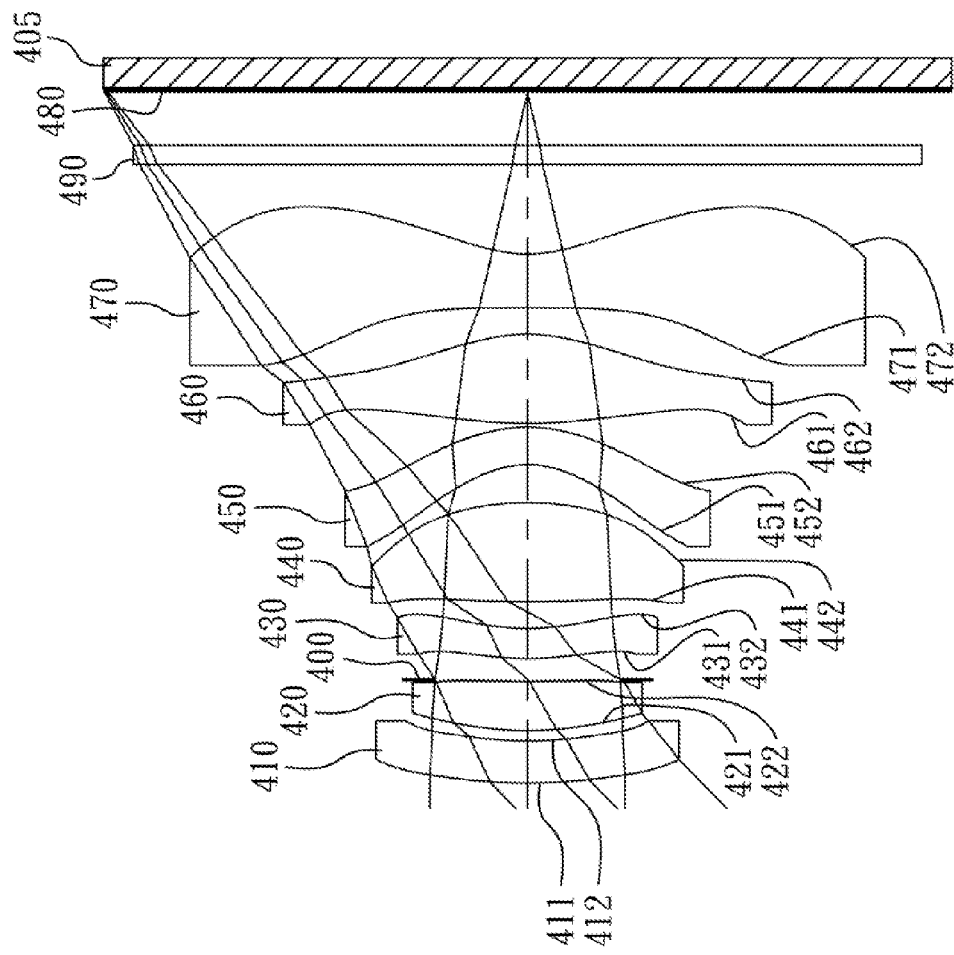
FIG. 7 is a schematic view of an image lens assembly system according to the 4th embodiment of the present disclosure.
Figure 8:
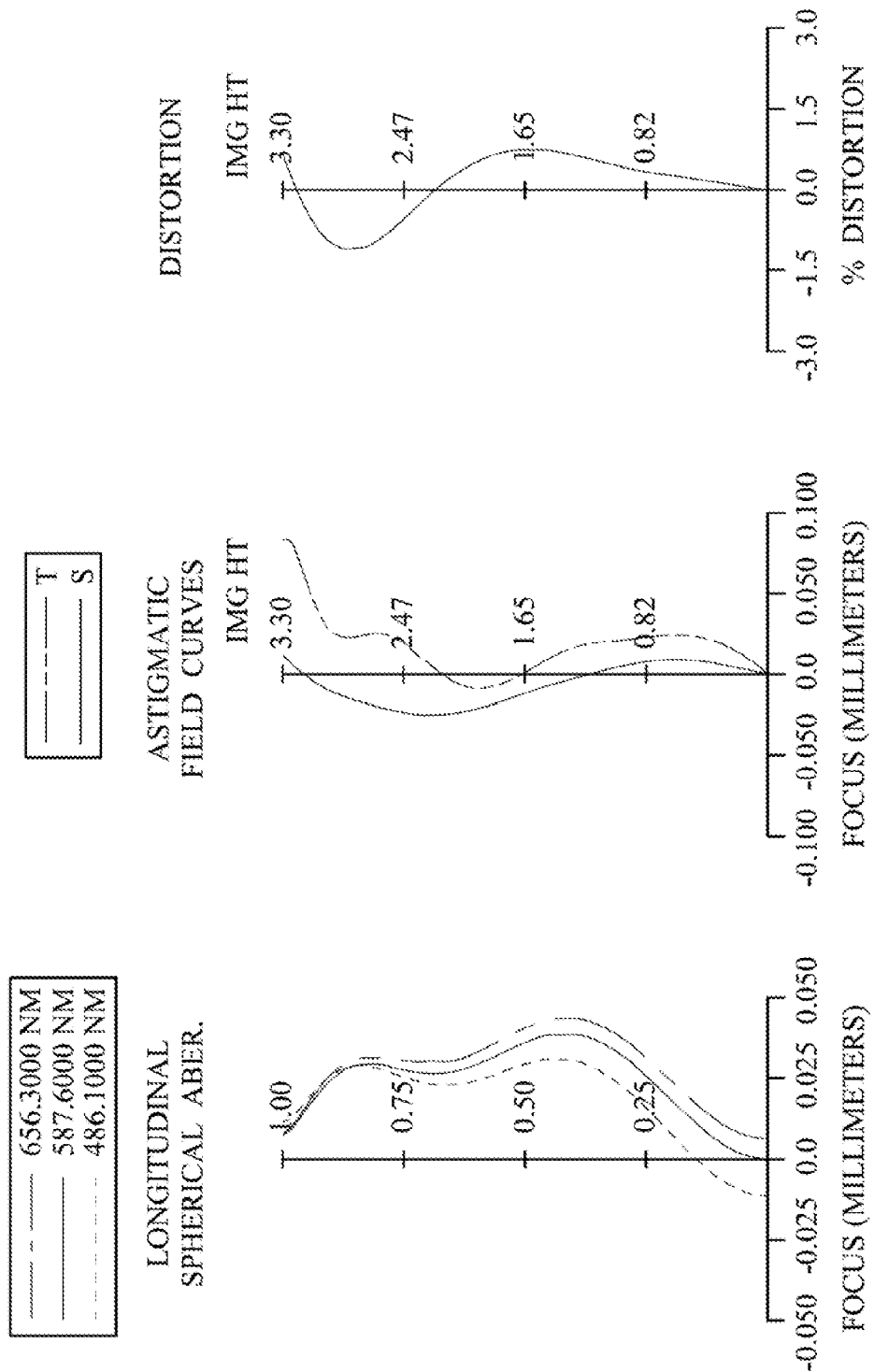
FIG. 8 shows spherical aberration curves, astigmatic field curves and a distortion curve of the image lens assembly system according to the 4th embodiment.

FIG. 7 is a schematic view of an image lens assembly system according to the 4th embodiment of the present disclosure. FIG. 8 shows spherical aberration curves, astigmatic field curves and a distortion curve of the image lens assembly system according to the 4th embodiment. In FIG. 7, the image lens assembly system includes, in order from an object side to an image side, a first lens element 410, a second lens element 420, an aperture stop 400, a third lens element 430, a fourth lens element 440, a fifth lens element 450, a sixth lens element 460, a seventh lens element 470, an IR-cut filter 490, an image plane 480, and an image sensor 405.

The first lens element 410 made of plastic material has negative refractive power. The first lens element 410 has a convex object-side surface 411 and a concave image-side surface 412, and both the object-side surface 411 and the image-side surface 412 thereof are aspheric.

The second lens element 420 made of plastic material has positive refractive power. The second lens element 420 has a convex object-side surface 421 and a concave image-side surface 422, and both the object-side surface 421 and the image-side surface 422 thereof are aspheric.

The third lens element 430 made of plastic material has negative refractive power. The third lens element 430 has a convex object-side surface 431 changing from convex at a paraxial region to concave at a peripheral region, and has a concave image-side surface 432 changing from concave at a paraxial region to convex at a peripheral region. Both the object-side surface 431 and the image-side surface 432 of the third lens element 430 are aspheric.

The fourth lens element 440 made of plastic material has positive refractive power. The fourth lens element 440 has a convex object-side surface 441 changing from convex at a paraxial region to concave at a peripheral region, and has a convex image-side surface 442 changing from convex at a paraxial region to concave at a peripheral region. Both the object-side surface 441 and the image-side surface 442 of the fourth lens element 440 are aspheric.

The fifth lens element 450 made of plastic material has negative refractive power. The fifth lens element 450 has a concave object-side surface 451 and a convex image-side surface 452, and both the object-side surface 451 and the image-side surface 452 thereof are aspheric.

The sixth lens element 460 made of plastic material has positive refractive power. The sixth lens element 460 has a convex object-side surface 461 and a convex image-side surface 462, and both the object-side surface 461 and the image-side surface 462 thereof are aspheric.

The seventh lens element 470 made of plastic material has negative refractive power. The seventh lens element 470 has a concave object-side surface 471, and has a concave image-side surface 472 changing from concave at a paraxial region to convex at a peripheral region. Both the object-side surface 471 and the image-side surface 472 of the seventh lens element 470 are aspheric.

The IR-cut filter 490 made of glass material is located between the seventh lens element 470 and the image plane 480, and will not affect a focal length of the image lens assembly system.

The detailed optical data of the 4th embodiment are shown in Table 7, and the aspheric surface data are shown in Table 8 below.

TABLE 7

4th Embodiment
f = 3.35 mm, Fno = 2.20, HFOV = 44.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 4.214200 | (ASP) | 0.329 | Plastic | 1.544 | 55.9 | −19.74 |
| 2 | | 2.943450 | (ASP) | 0.080 | | | | |
| 3 | Lens 2 | 2.460420 | (ASP) | 0.384 | Plastic | 1.544 | 55.9 | 5.41 |
| 4 | | 14.121200 | (ASP) | 0.012 | | | | |
| 5 | Ape. Stop | Plano | | 0.163 | | | | |
| 6 | Lens 3 | 2.236520 | (ASP) | 0.240 | Plastic | 1.634 | 23.8 | −20.13 |
| 7 | | 1.823770 | (ASP) | 0.208 | | | | |
| 8 | Lens 4 | 7.796900 | (ASP) | 0.773 | Plastic | 1.544 | 55.9 | 3.36 |
| 9 | | −2.302230 | (ASP) | 0.298 | | | | |
| 10 | Lens 5 | −0.728320 | (ASP) | 0.288 | Plastic | 1.634 | 23.8 | −3.92 |
| 11 | | −1.187800 | (ASP) | 0.03 | | | | |
| 12 | Lens 6 | 3.319500 | (ASP) | 0.700 | Plastic | 1.530 | 55.8 | 1.82 |
| 13 | | −1.264190 | (ASP) | 0.202 | | | | |
| 14 | Lens 7 | −1.86,448300 | (ASP) | 0.424 | Plastic | 1.530 | 56.8 | −1.88 |
| 15 | | 1.001310 | (ASP) | 0.700 | | | | |
| 16 | IR-cut filter | Plano | | 0.150 | Glass | 1.516 | 64.1 | — |
| 17 | | Plano | | 0.433 | | | | |
| 18 | Image | Plano | | — | | | | |

Note:
Reference wavelength (d-line) is 587.6 nm.

TABLE 8

Aspheric Coefficients

| Surface # | 1 | 2 | 3 | 4 | 6 |
|---|---|---|---|---|---|
| k = | −5.05854E+00 | −1.38007E+01 | −7.59254E+00 | −2.00000E+01 | −7.44068E+00 |
| A4 = | −1.23255E−02 | −3.22732E−02 | −3.22045E−02 | −6.86343E−02 | −1.85173E−01 |
| A6 = | 7.70529E−04 | 2.70887E−02 | 1.30369E−01 | −3.10218E−02 | 1.70456E−01 |
| A8 = | 7.09586E−03 | −3.50330E−02 | −3.72286E−02 | 1.15505E−01 | −3.48762E−01 |
| A10 = | 8.90748E−03 | 1.14508E−01 | 3.27617E−01 | −2.33483E−01 | 2.52156E−01 |
| A12 = | −3.11243E−03 | 3.03482E−10 | 3.32816E−01 | 1.09875E−01 | 2.35822E−03 |
| A14 = | | | −4.27632E−01 | −4.04522E−02 | −2.26124E−01 |

| Surface # | 7 | 8 | 9 | 10 | 11 |
|---|---|---|---|---|---|
| k = | −3.60919E+00 | 3.00000E+00 | 3.72475E−01 | −1.51861E+00 | −1.92807E+00 |
| A4 = | −1.59191E−01 | −4.46198E−02 | −4.26839E−02 | 2.30820E−01 | 8.51722E−02 |
| A6 = | 1.16297E−01 | −1.85593E−02 | −4.20463E−02 | −3.79310E−01 | −1.15248E−01 |

TABLE 8-continued

| Aspheric Coefficients | | | | |
|---|---|---|---|---|
| A8 = | −1.12696E−01 | 3.58744E−02 | 1.27154E−02 | 3.61408E−01 | 1.05495E−01 |
| A10 = | 3.50754E−02 | −2.99070E−02 | −3.52235E−03 | −2.10044E−01 | −5.64200E−02 |
| A12 = | −2.03570E−02 | −1.76946E−02 | 3.49338E−03 | 9.70960E−02 | 2.07635E−02 |
| A14 = | −5.77217E−03 | 1.71898E−02 | 1.27900E−03 | −2.38381E−02 | −3.55857E−03 |

| Surface # | 12 | 13 | 14 | 15 |
|---|---|---|---|---|
| k = | −3.07221E+00 | −7.43426E+00 | −1.00000E+00 | −6.01722E+00 |
| A4 = | −1.03673E−01 | 9.61676E−03 | −8.46158E−02 | −4.51025E−02 |
| A6 = | 7.00659E−02 | −1.30314E−02 | 1.94713E−02 | 1.11753E−02 |
| A8 = | −2.66557E−02 | 3.25775E−02 | −1.91902E−03 | −2.17545E−03 |
| A10 = | 4.01634E−03 | −1.90280E−02 | 1.56851E−04 | 2.27260E−04 |
| A12 = | −3.93497E−04 | 4.36138E−03 | 3.17822E−05 | −1.41643E−05 |
| A14 = | 3.11161E−05 | −3.54236E−04 | −7.05826E−06 | 4.96442E−07 |

In the image lens assembly system according to the 4th embodiment, the definitions of f, f12, f2, f4, f7, Fno, FOV, HFOV, V5, V6, R9, R10, R13, R14, ΣCT, T12, Td, TTL, and ImgH are the same as those stated in the 1st embodiment with corresponding values for the 4th embodiment. Moreover, these parameters can be calculated from Table 7 and Table 8 as the following values and satisfy the following relationships:

| f (mm) | 3.35 | f7/f | −0.56 |
|---|---|---|---|
| Fno | 2.20 | f/f12 | 0.43 |
| HFOV (deg.) | 44.2 | f/f2 + f/f4 | 1.62 |
| V5/V6 | 0.43 | Td (mm) | 4.131 |
| T12/f | 0.024 | ΣCT/Td | 0.76 |
| |(R9 − R10)/(R9 + R10)| | 0.24 | TTL/ImgH | 1.63 |
| R14/|R13| | 0.01 | FOV (deg.) | 88.4 |

5th Embodiment

Figure 9:
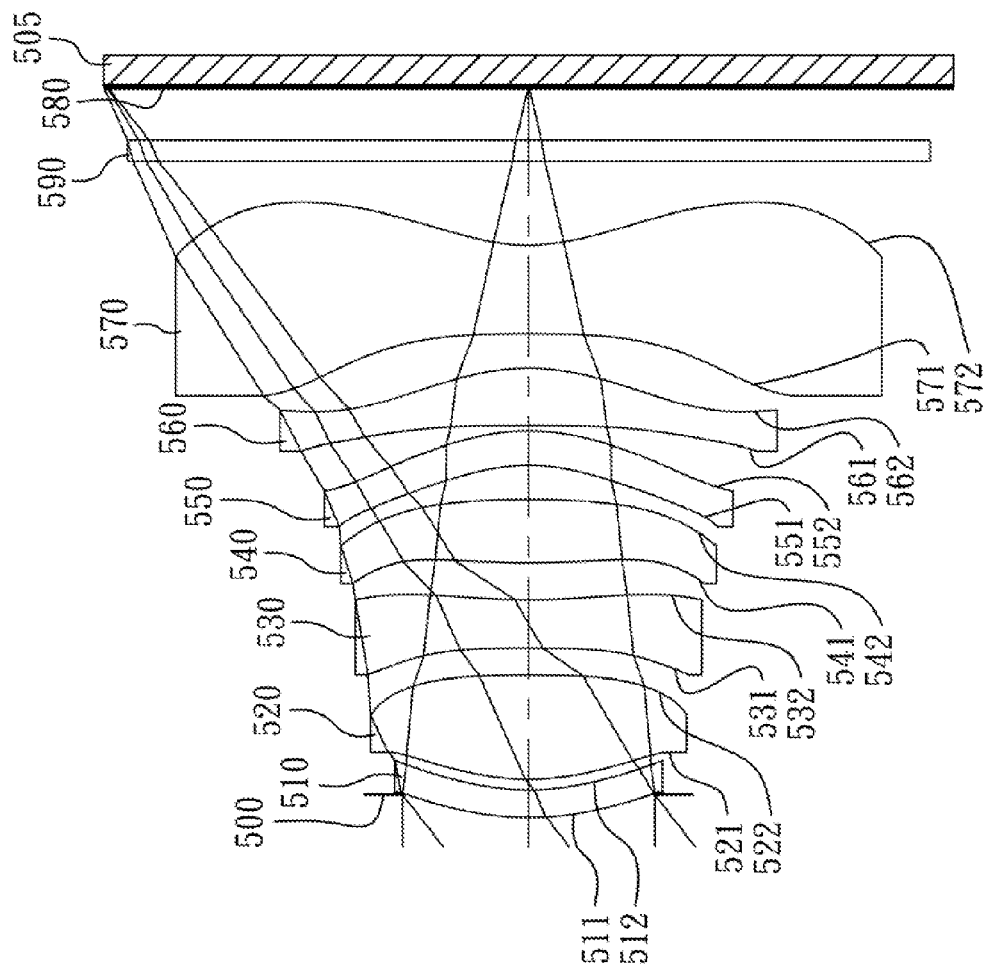
FIG. 9 is a schematic view of an image lens assembly system according to the 5th embodiment of the present disclosure.
Figure 10:
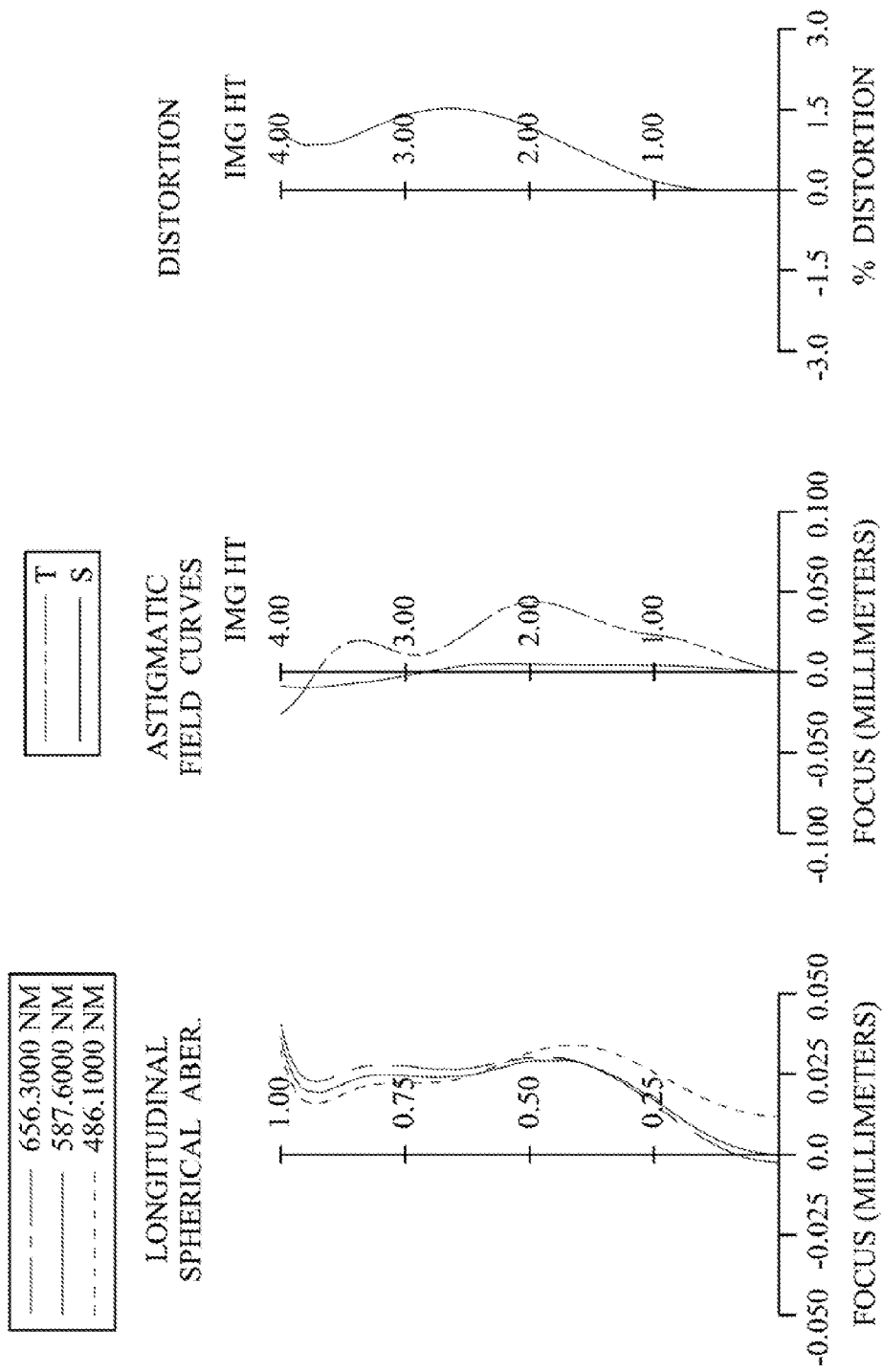
FIG. 10 shows spherical aberration curves, astigmatic field curves and a distortion curve of the image lens assembly system according to the 5th embodiment.

FIG. 9 is a schematic view of an image lens assembly system according to the 5th embodiment of the present disclosure. FIG. 10 shows spherical aberration curves, astigmatic field curves and a distortion curve of the image lens assembly system according to the 5th embodiment. In FIG. 9, the image lens assembly system includes, in order from an object side to an image side, an aperture stop 500, a first lens element 510, a second lens element 520, a third lens element 530, a fourth lens element 540, a fifth lens element 550, a sixth lens element 560, a seventh lens element 570, an IR-cut filter 590, an image plane 580, and an image sensor 505. The aperture stop 500 is located between an object and the first lens element 510 as a front stop.

The first lens element 510 made of plastic material has negative refractive power. The first lens element 510 has a convex object-side surface 511 and a concave image-side surface 512, and both the object-side surface 511 and the image-side surface 512 thereof are aspheric.

The second lens element 520 made of plastic material has positive refractive power. The second lens element 520 has a convex object-side surface 521 and a convex image-side surface 522, and both the object-side surface 521 and the image-side surface 522 thereof are aspheric.

The third lens element 530 made of plastic material has negative refractive power. The third lens element 530 has a concave object-side surface 531 changing from concave at a paraxial region to convex at a peripheral region, and has a concave image-side surface 532 changing from concave at a paraxial region to convex at a peripheral region. Both the object-side surface 531 and the image-side surface 532 of the third lens element 530 are aspheric.

The fourth lens element 540 made of plastic material has positive refractive power. The fourth lens element 540 has a convex object-side surface 541 changing from convex at a paraxial region to concave at a peripheral region, and has a convex image-side surface 542. Both the object-side surface 541 and the image-side surface 542 of the fourth lens element 540 are aspheric.

The fifth lens element 550 made of plastic material has negative refractive power. The fifth lens element 550 has a concave object-side surface 551 and a convex image-side surface 552, and both the object-side surface 551 and the image-side surface 552 thereof are aspheric.

The sixth lens element 560 made of plastic material has positive refractive power. The sixth lens element 560 has a concave object-side surface 561 and a convex image-side surface 562, and both the object-side surface 561 and the image-side surface 562 thereof are aspheric.

The seventh lens element 570 made of plastic material has negative refractive power. The seventh lens element 570 has a concave object-side surface 571, and has a concave image-side surface 572 changing from concave at a paraxial region to convex at a peripheral region. Both the object-side surface 571 and the image-side surface 572 of the seventh lens element 570 are aspheric.

The IR-cut filter 590 made of glass material is located between the seventh lens element 570 and the image plane 580, and will not affect a focal length of the image lens assembly system.

The detailed optical data of the 5th embodiment are shown in Table 9, and the aspheric surface data are shown in Table 10 below.

TABLE 9

5th Embodiment
f = 5.14 mm, Fno = 2.15, HFOV = 37.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.217 | | | | |
| 2 | Lens 1 | 2.716210 | (ASP) | 0.260 | Plastic | 1.640 | 23.3 | −19.69 |
| 3 | | 2.151010 | (ASP) | 0.103 | | | | |
| 4 | Lens 2 | 2.277860 | (ASP) | 0.986 | Plastic | 1.535 | 56.3 | 3.80 |
| 5 | | −15.805900 | (ASP) | 0.254 | | | | |
| 6 | Lens 3 | −35.260900 | (ASP) | 0.465 | Plastic | 1.640 | 23.3 | −7.50 |
| 7 | | 5.581400 | (ASP) | 0.348 | | | | |
| 8 | Lens 4 | 8.056500 | (ASP) | 0.605 | Plastic | 1.544 | 55.9 | 7.33 |
| 9 | | −7.688000 | (ASP) | 0.325 | | | | |
| 10 | Lens 5 | −1.684510 | (ASP) | 0.320 | Plastic | 1.640 | 23.3 | −22.09 |
| 11 | | −2.054210 | (ASP) | 0.050 | | | | |
| 12 | Lens 6 | −96.572600 | (ASP) | 0.552 | Plastic | 1.535 | 56.3 | 3.80 |
| 13 | | −1.994410 | (ASP) | 0.327 | | | | |
| 14 | Lens 7 | −15.631600 | (ASP) | 0.838 | Plastic | 1.535 | 56.3 | −2.73 |
| 15 | | 1.642430 | (ASP) | 0.800 | | | | |
| 16 | IR-cut filter | Plano | | 0.200 | Glass | 1.516 | 64.1 | — |
| 17 | | Plano | | 0.504 | | | | |
| 18 | Image | Plano | | — | | | | |

Note:
Reference wavelength (d-line) is 587.6 nm.

TABLE 10

Aspheric Coefficients

| Surface # | 2 | 3 | 4 | 5 | 6 |
|---|---|---|---|---|---|
| k = | −6.94307E+00 | −8.14898E+00 | −5.17435E+00 | −1.00000E+00 | 5.00000E+00 |
| A4 = | 4.22104E−03 | 1.39545E−04 | −1.99725E−02 | −4.26316E−02 | −8.41662E−02 |
| A6 = | 8.18256E−03 | 8.94243E−03 | 3.18270E−02 | 1.32633E−04 | 4.43291E−02 |
| A8 = | −3.62816E−03 | −3.88932E−03 | −3.03093E−02 | 4.11359E−02 | −3.09328E−02 |
| A10 = | −1.93304E−04 | 1.41567E−03 | 1.18767E−02 | −9.59248E−03 | 1.64999E−02 |
| A12 = | 2.80938E−04 | −3.65430E−04 | 4.04056E−04 | 5.85395E−03 | −5.11371E−03 |
| A14 = | | | −1.51237E−03 | −1.38569E−03 | 7.32908E−04 |

| Surface # | 7 | 8 | 9 | 10 | 11 |
|---|---|---|---|---|---|
| k = | −2.16226E+00 | −1.00000E+00 | −1.54980E+01 | −1.99409E+00 | −2.32490E+00 |
| A4 | −6.27225E−02 | −2.88931E−02 | 3.11743E−03 | 1.08699E−01 | 3.61596E−02 |
| A6 = | 3.20621E−02 | 9.55481E−03 | −2.02378E−02 | −8.35968E−02 | −2.70048E−02 |
| A8 = | −1.39033E−02 | 3.69341E−03 | 3.30187E−03 | 4.29345E−02 | 1.27475E−02 |
| A10 = | 3.77507E−03 | −1.22723E−03 | 1.79869E−04 | −1.53165E−02 | −3.94726E−03 |
| A12 = | −9.82407E−04 | −3.32053E−04 | 1.99280E−05 | 3.52109E−03 | 7.97045E−04 |
| A14 = | 1.60044E−04 | 1.55299E−04 | −2.07325E−05 | −3.86084E−04 | −6.93300E−05 |

| Surface # | 12 | 13 | 14 | 15 |
|---|---|---|---|---|
| k = | −1.00000E+00 | −6.70032E+00 | −1.00000E+01 | −6.56116E+00 |
| A4 = | −3.72783E−02 | −6.14237E−03 | −3.17134E−02 | −1.96973E−02 |
| A6 = | 1.39695E−02 | 1.04363E−04 | 2.82142E−03 | 2.81696E−03 |
| A8 = | −2.98708E−03 | 4.00709E−03 | 1.22184E−05 | −3.51826E−04 |
| A10 = | 3.54044E−04 | −1.31020E−03 | 2.92989E−05 | 2.71673E−05 |
| A12 = | −3.32583E−06 | 1.63771E−04 | 3.22859E−07 | −1.38977E−06 |
| A14 = | −3.15763E−06 | −7.55243E−06 | −4.49773E−07 | 3.37955E−08 |

In the image lens assembly system according to the 5th embodiment, the definitions of f, f12, f2, f4, f7, Fno, FOV, HFOV, V5, V6, R9, R10, R13, R14, ΣCT, T12, Td, TTL, and ImgH are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 5.14 | f7/f | −0.53 |
| Fno | 2.15 | f/f12 | 1.06 |
| HFOV (deg.) | 37.5 | f/f2 + f/f4 | 2.06 |
| V5/V6 | 0.41 | Td (mm) | 5.433 |
| T12/f | 0.020 | ΣCT/Td | 0.74 |
| |(R9 − R10)/(R9 + R10)| | 0.10 | TTL/ImgH | 1.72 |
| R14/|R13| | 0.11 | FOV (deg.) | 75.0 |

6th Embodiment

Figure 11:
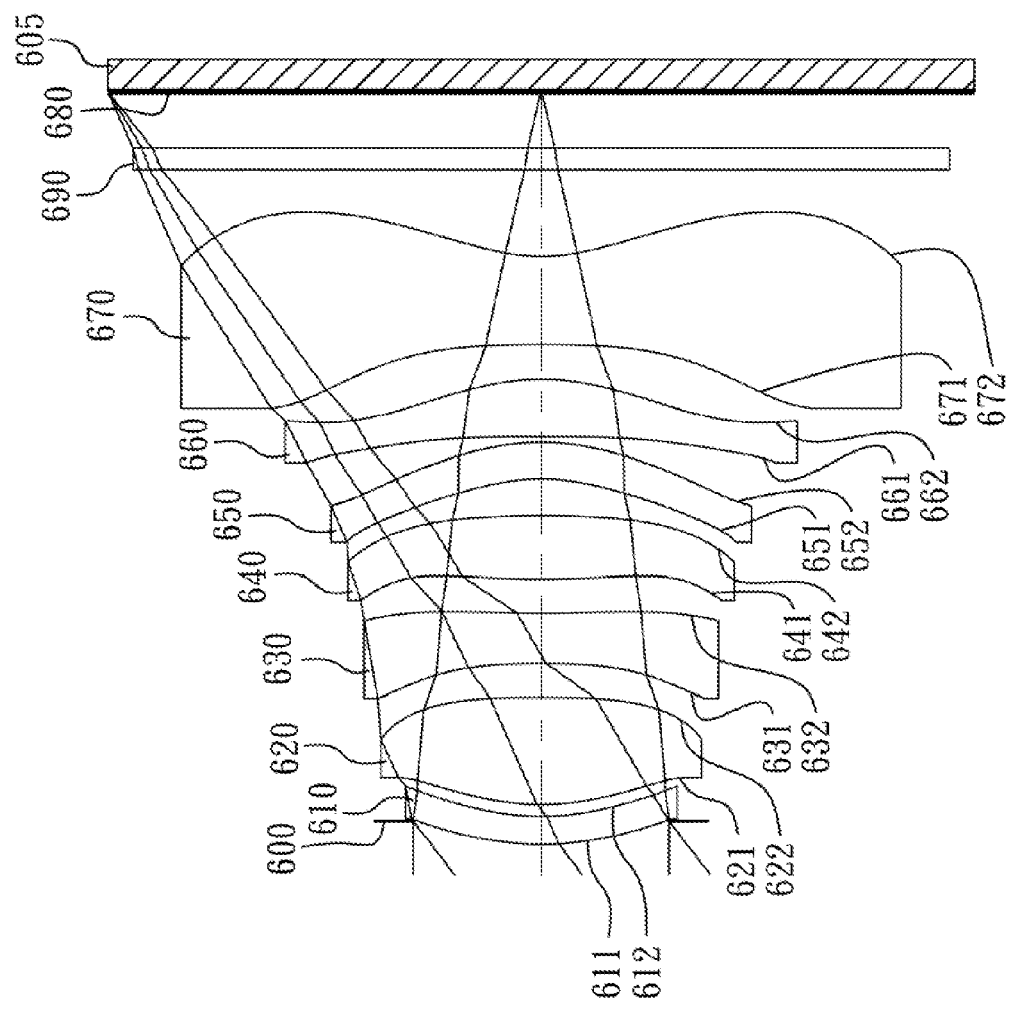
FIG. 11 is a schematic view of an image lens assembly system according to the 6th embodiment of the present disclosure.
Figure 12:
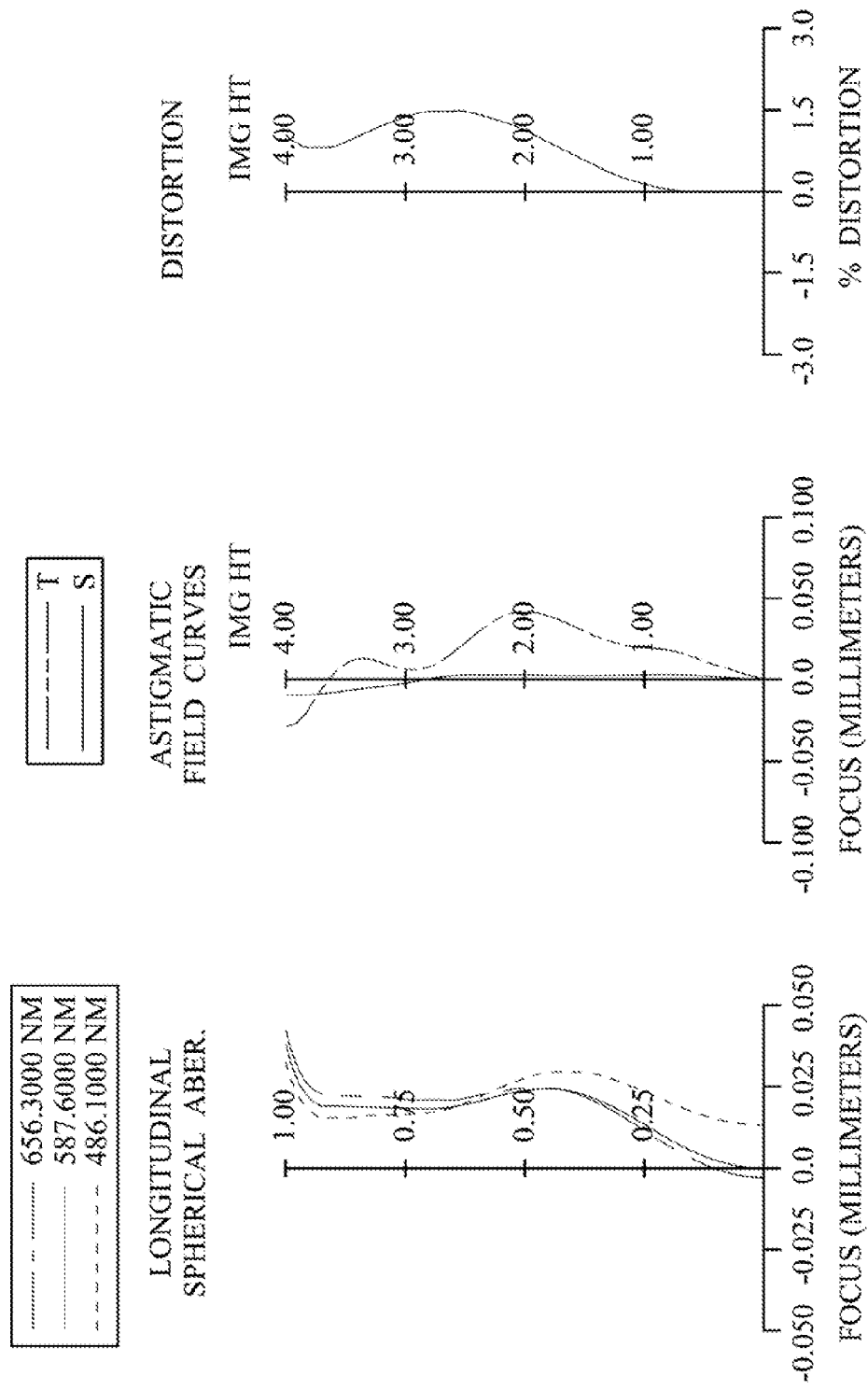
FIG. 12 shows spherical aberration curves, astigmatic field curves and a distortion curve of the image lens assembly system according to the 6th embodiment.

FIG. 11 is a schematic view of an image lens assembly system according to the 6th embodiment of the present disclosure. FIG. 12 shows spherical aberration curves, astigmatic field curves and a distortion curve of the image lens assembly system according to the 6th embodiment. In FIG. 11, the image lens assembly system includes, in order from an object side to an image side, an aperture stop 600, a first lens element 610, a second lens element 620, a third lens element 630, a fourth lens element 640, a fifth lens element 650, a sixth lens element 660, a seventh lens element 670, an IR-cut filter 690, an image plane 680, and an image sensor 605. The aperture stop 600 is located between an object and the first lens element 610 as a front stop.

The first lens element 610 made of plastic material has negative refractive power. The first lens element 610 has a convex object-side surface 611 and a concave image-side surface 612, and both the object-side surface 611 and the image-side surface 612 thereof are aspheric.

The second lens element 620 made of plastic material has positive refractive power. The second lens element 620 has a convex object-side surface 621 and a convex image-side surface 622, and both the object-side surface 621 and the image-side surface 622 thereof are aspheric.

The third lens element 630 made of plastic material has negative refractive power. The third lens element 630 has a concave object-side surface 631 changing from concave at a paraxial region to convex at a peripheral region, and has a concave image-side surface 632 changing from concave at a paraxial region to convex at a peripheral region. Both the object-side surface 631 and the image-side surface 632 of the third lens element 630 are aspheric.

The fourth lens element 640 made of plastic material has positive refractive power. The fourth lens element 640 has a convex object-side surface 641 changing from convex at a paraxial region to concave at a peripheral region, and has a convex image-side surface 642. Both the object-side surface 641 and the image-side surface 642 of the fourth lens element 640 are aspheric.

The fifth lens element 650 made of plastic material has negative refractive power. The fifth lens element 650 has a concave object-side surface 651 and a convex image-side surface 652, and both the object-side surface 651 and the image-side surface 652 thereof are aspheric.

The sixth lens element 660 made of plastic material has positive refractive power. The sixth lens element 660 has a concave object-side surface 661 and a convex image-side surface 662, and both the object-side surface 661 and the image-side surface 662 thereof are aspheric.

The seventh lens element 670 made of plastic material has negative refractive power. The seventh lens element 670 has a concave object-side surface 671, and has a concave image-side surface 672 changing from concave at a paraxial region to convex at a peripheral region. Both the object-side surface 671 and the image-side surface 672 of the seventh lens element 670 are aspheric.

The IR-cut filter 690 made of glass material is located between the seventh lens element 670 and the image plane 680, and will not affect a focal length of the image lens assembly system.

The detailed optical data of the 6th embodiment are shown in Table 11, and the aspheric surface data are shown in Table 12 below.

TABLE 11

6th Embodiment
f = 5.20 mm, Fno = 2.20, HFOV = 37.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.217 | | | | |
| 2 | Lens 1 | 2.671740 | (ASP) | 0.260 | Plastic | 1.640 | 23.3 | −20.44 |
| 3 | | 2.134280 | (ASP) | 0.112 | | | | |
| 4 | Lens 2 | 2.273620 | (ASP) | 0.990 | Plastic | 1.535 | 56.3 | 3.69 |
| 5 | | −12.672700 | (ASP) | 0.310 | | | | |
| 6 | Lens 3 | −8.106400 | (ASP) | 0.469 | Plastic | 1.640 | 23.3 | −5.71 |
| 7 | | 9.338400 | (ASP) | 0.312 | | | | |
| 8 | Lens 4 | 7.333200 | (ASP) | 0.591 | Plastic | 1.544 | 66.9 | 7.36 |
| 9 | | −8.577000 | (ASP) | 0.339 | | | | |
| 10 | Lens 5 | −1.811810 | (ASP) | 0.336 | Plastic | 1.640 | 23.3 | −33.40 |
| 11 | | −2.122900 | (ASP) | 0.050 | | | | |
| 12 | Lens 6 | −96.572600 | (ASP) | 0.537 | Plastic | 1.535 | 56.3 | 3.91 |
| 13 | | −2.052040 | (ASP) | 0. 21 | | | | |
| 14 | Lens 7 | −13.965600 | (ASP) | 0.816 | Plastic | 1.535 | 56.3 | −2.69 |
| 15 | | 1.633240 | (ASP) | 0.800 | | | | |
| 16 | IR-cut filter | Plano | | 0.200 | Glass | 1.516 | 64.1 | — |
| 17 | | Plano | | 0.522 | | | | |
| 18 | Image | Plano | | — | | | | |

Note:
Reference wavelength (d-ine) is 587.6 nm.

TABLE 12

Aspheric Coefficients

| Surface # | 2 | 3 | 4 | 5 | 6 |
|---|---|---|---|---|---|
| k = | −6.72391E+00 | −7.93836E+00 | −4.82263E+00 | −1.00000E+00 | −1.78425E+01 |
| A4 = | 5.89055E−03 | 3.41975E−03 | −2.10063E−02 | 4.26244E−02 | −8.41652E−02 |
| A6 = | 8.37979E−03 | 8.93246E−03 | 3.05839E−02 | −3.44627E−03 | 4.44625E−02 |

TABLE 12-continued

| Aspheric Coefficients | | | | | |
|---|---|---|---|---|---|
| A8 = | −4.13178E−03 | −6.05534E−03 | −2.96620E−02 | 5.44796E−03 | −3.06127E−02 |
| A10 = | 7.13033E−05 | 2.04663E−03 | 1.11528E−02 | −9.89224E−03 | 1.65974E−02 |
| A12 = | 2.80938E−04 | −3.65430E−04 | 4.04056E−02 | 5.85395E−03 | −5.09214E−03 |
| A14 = | | | −1.51237E−03 | −1.38569E−03 | 7.32908E−04 |

| Surface # | 7 | 8 | 9 | 10 | 11 |
|---|---|---|---|---|---|
| k = | −8.64883E−01 | −1.00000E+00 | −2.00000E+01 | −1.88282E+00 | −2.41793E+00 |
| A4 = | −6.25474E−02 | −3.05721E−02 | 5.51924E−03 | 1.08246E−01 | 3.59674E−02 |
| A6 = | 3.26241E−02 | −9.61223E−03 | −2.07962E−02 | −8.37136E−02 | −2.14465E−02 |
| A8 = | −1.38002E−02 | 3.55155E−03 | 3.36547E−03 | 4.27394E−02 | 1.25947E−02 |
| A10 = | 3.84785E−03 | −1.18542E−03 | 1.61109E−04 | −1.53714E−02 | −3.96363E−03 |
| A12 = | −9.94127E−04 | −3.18188E−03 | 1.67176E−05 | 3.51760E−03 | −8.00038E−04 |
| A14 = | 1.58774E−04 | 1.48513E−04 | −2.23509E−05 | −3.78145E−04 | −6.72732E−05 |

| Surface # | 12 | 13 | 14 | 15 |
|---|---|---|---|---|
| k = | −1.00000E+00 | −7.15590E+00 | −1.36813E−01 | −6.59361E+00 |
| A4 = | −3.59634E−02 | −6.25905E−03 | −3.02949E−02 | −1.97049E−02 |
| A6 = | 1.37844E−02 | 1.47369E−04 | 2.65203E−03 | 2.82468E−03 |
| A8 = | −2.99095E−03 | 3.98427E−03 | 2.28052E−05 | −3.50784E−04 |
| A10 = | 3.49422E−04 | −1.30964E−03 | 2.98654E−05 | 2.64610E−05 |
| A12 = | −3.23093E−06 | 1.63932E−04 | 4.58361E−07 | −1.30249E−06 |
| A14 = | −3.04845E−06 | −7.54823E−06 | −4.77717E−07 | 3.02317E−08 |

In the image lens assembly system according to the 6th embodiment, the definitions of f, f12, f2, f4, f7, Fno, FOV, HFOV, V5, V6, R9, R10, R13, R14, ΣCT, T12, Td, TTL, and ImgH are the same as those stated in the 1st embodiment with corresponding values for the 6th embodiment. Moreover, these parameters can be calculated from Table 11 and Table 12 as the following values and satisfy the following relationships:

| f (mm) | 5.20 | f7/f | −0.52 |
|---|---|---|---|
| Fno | 2.20 | f/f12 | 1.12 |
| HFOV (deg.) | 37.2 | f/f2 + f/f4 | 2.12 |
| V5/V6 | 0.41 | Td (mm) | 5.443 |
| T12/f | 0.022 | ΣCT/Td | 0.73 |
| |(R9 − R10)/(R9 + R10)| | 0.08 | TTL/ImgH | 1.72 |
| R14/|R13| | 0.12 | FOV (deg.) | 74.4 |

7th Embodiment

Figure 13:
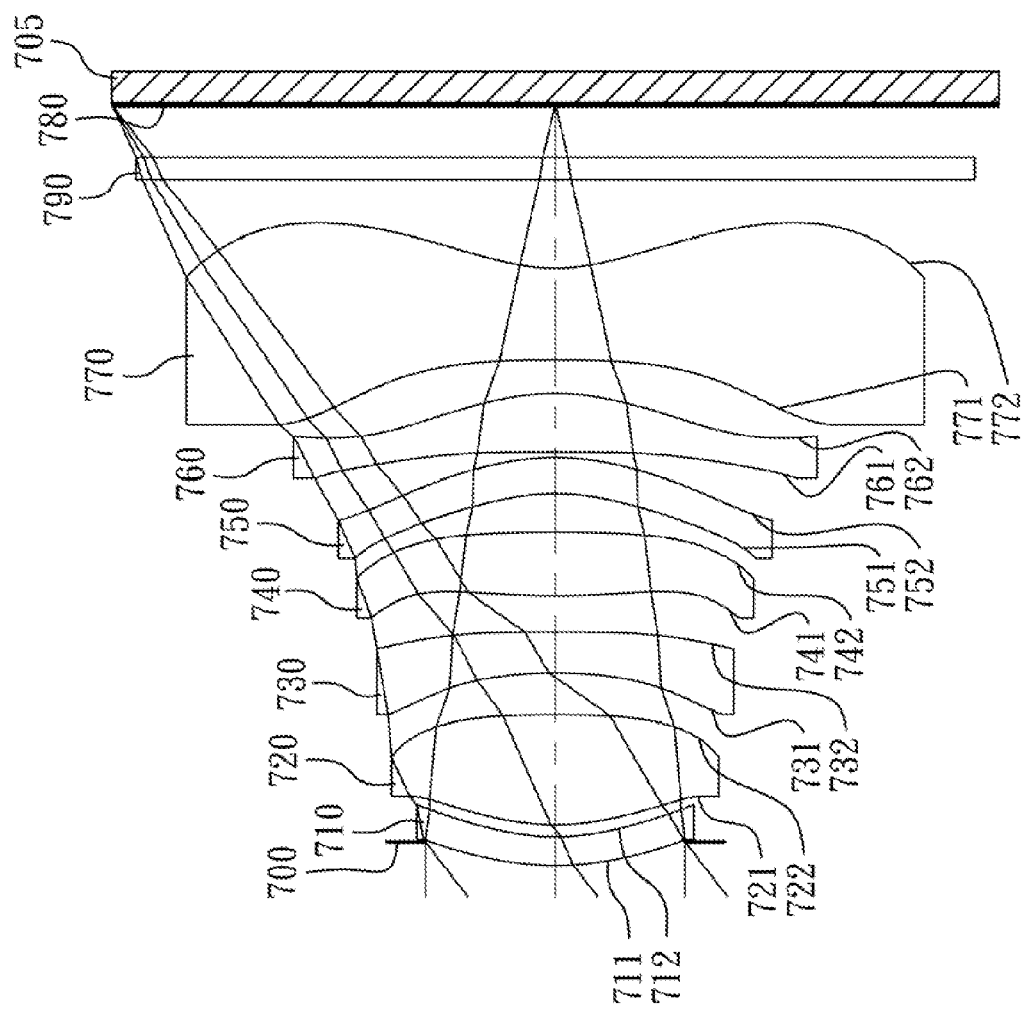
FIG. 13 is a schematic view of an image lens assembly system according to the 7th embodiment of the present disclosure.
Figure 14:
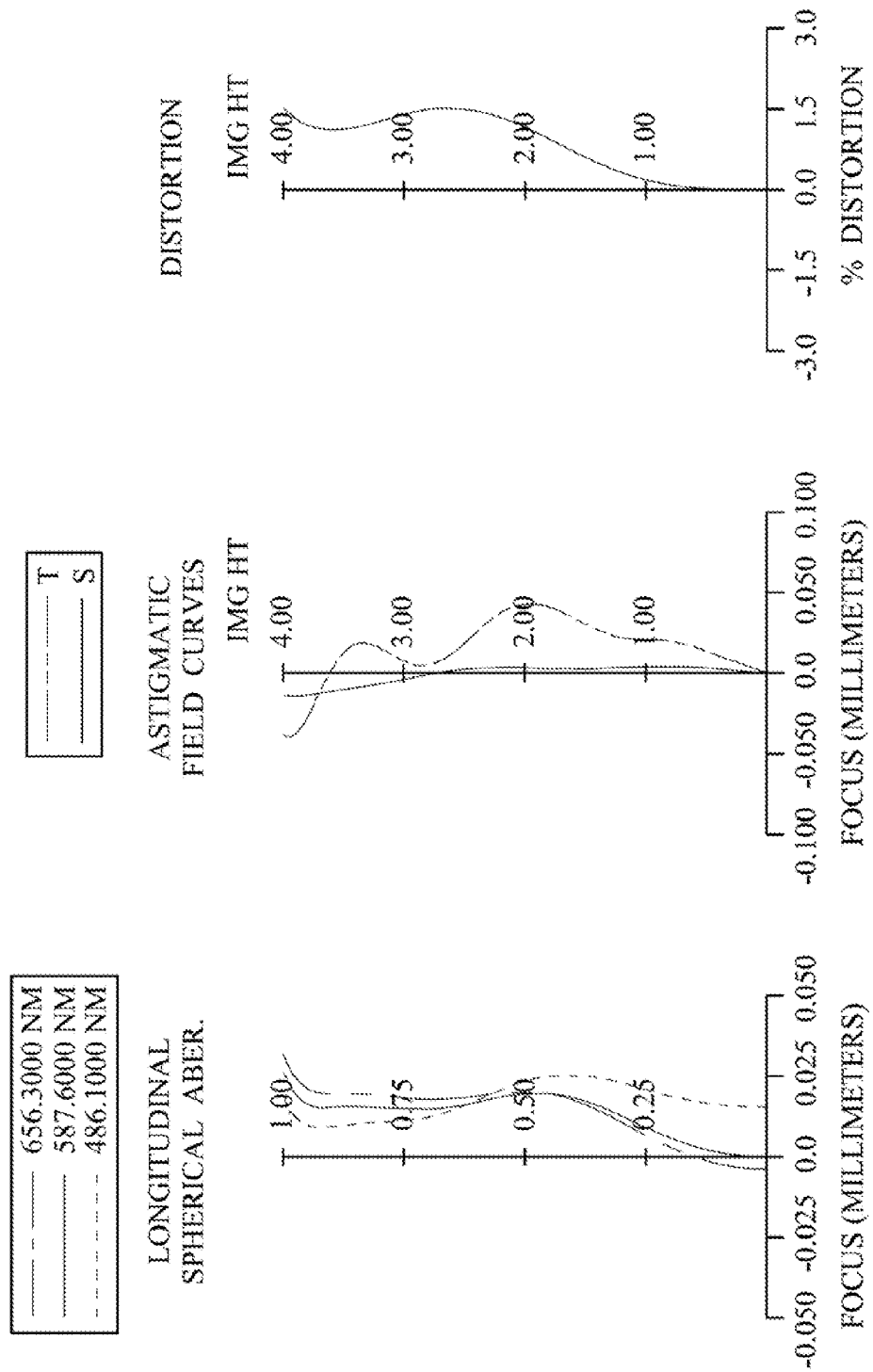
FIG. 14 shows spherical aberration curves, astigmatic field curves and a distortion curve of the image lens assembly system according to the 7th embodiment.

FIG. 13 is a schematic view of an image lens assembly system according to the 7th embodiment of the present disclosure. FIG. 14 shows spherical aberration curves, astigmatic field curves and a distortion curve of the image lens assembly system according to the 7th embodiment. In FIG. 13, the image lens assembly system includes, in order from an object side to an image side, an aperture stop 700, a first lens element 710, a second lens element 720, a third lens element 730, a fourth lens element 740, a fifth lens element 750, a sixth lens element 760, a seventh lens element 770, an IR-cut filter 790, an image plane 780, and an image sensor 705. The aperture stop 700 is located between an object and the first lens element 710 as a front stop.

The first lens element 710 made of plastic material has negative refractive power. The first lens element 710 has a convex object-side surface 711 and a concave image-side surface 712, and both the object-side surface 711 and the image-side surface 712 thereof are aspheric.

The second lens element 720 made of plastic material has positive refractive power. The second lens element 720 has a convex object-side surface 721 and a convex image-side surface 722, and both the object-side surface 721 and the image-side surface 722 thereof are aspheric.

The third lens element 730 made of plastic material has negative refractive power. The third lens element 730 has a concave object-side surface 731 changing from concave at a paraxial region to convex at a peripheral region, and has a convex image-side surface 732 changing from convex at a paraxial region to concave at a peripheral region. Both the object-side surface 731 and the image-side surface 732 of the third lens element 730 are aspheric.

The fourth lens element 740 made of plastic material has positive refractive power. The fourth lens element 740 has a convex object-side surface 741 changing from convex at a paraxial region to concave at a peripheral region, and has a convex image-side surface 742. Both the object-side surface 741 and the image-side surface 742 of the fourth lens element 740 are aspheric.

The fifth lens element 750 made of plastic material has negative refractive power. The fifth lens element 750 has a concave object-side surface 751 and a convex image-side surface 752, and both the object-side surface 751 and the image-side surface 752 thereof are aspheric.

The sixth lens element 760 made of plastic material has positive refractive power. The sixth lens element 760 has a concave object-side surface 761 and a convex image-side surface 762, and both the object-side surface 761 and the image-side surface 762 thereof are aspheric.

The seventh lens element 770 made of plastic material has negative refractive power. The seventh lens element 770 has a concave object-side surface 771, and has a concave image-side surface 772 changing from concave at a paraxial region to convex at a peripheral region. Both the object-side surface 771 and the image-side surface 772 of the seventh lens element 770 are aspheric.

The IR-cut filter 790 made of glass material is located between the seventh lens element 770 and the image plane 780, and will not affect a focal length of the image lens assembly system.

The detailed optical data of the 7th embodiment are shown in Table 13, and the aspheric surface data are shown in Table 14 below.

TABLE 13

7th Embodiment
f = 5.15 mm, Fno = 2.20, HFOV = 37.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.214 | | | | |
| 2 | Lens 1 | 2.50080 | (ASP) | 0.260 | Plastic | 1.640 | 23.3 | −16.56 |
| 3 | | 1.986780 | (ASP) | 0.109 | | | | |
| 4 | Lens 2 | 2.161120 | (ASP) | 0.990 | Plastic | 1.535 | 56.3 | 3.51 |
| 5 | | −11.923600 | (ASP) | 0.379 | | | | |
| 6 | Lens 3 | −4.459700 | (ASP) | 0.372 | Plastic | 1.640 | 23.3 | −7.06 |
| 7 | | −351.864900 | (ASP) | 0.320 | | | | |
| 8 | Lens 4 | 6.3434 | (ASP) | 0.581 | Plastic | 1.544 | 55.9 | 7.77 |
| 9 | | −12.284200 | (ASP) | 0.349 | | | | |
| 10 | Lens 5 | −1.872470 | (ASP) | 0.320 | Plastic | 1.640 | 23.3 | −32.09 |
| 11 | | −2.197750 | (ASP) | 0.050 | | | | |
| 12 | Lens 6 | −96.572600 | (ASP) | 0.534 | Plastic | 1.535 | 56.3 | 3.94 |
| 13 | | −2.067680 | (ASP) | 0.301 | | | | |
| 14 | Lens 7 | −14.930600 | (ASP) | 0.829 | Plastic | 1.535 | 56.3 | −2.70 |
| 15 | | 1.630160 | (ASP) | 0.800 | | | | |
| 16 | IR-cut filter | Plano | | 0.260 | Glass | 1.516 | 64.1 | — |
| 17 | | Plano | | 0.475 | | | | |
| 18 | Image | Plano | | — | | | | |

Note:
Reference wavelength (d-line) is 587 nm.

TABLE 14

Aspheric Coefficients

| Surface # | 2 | 3 | 4 | 5 | 6 |
|---|---|---|---|---|---|
| k = | −6.98315E+00 | −7.44100E+00 | −4.79409E+00 | −1.00000E+00 | −1.05906E+01 |
| A4 = | 6.28108E−03 | 4.04200E−03 | −1.98815E−02 | −3.62901E−02 | −8.42035E−02 |
| A6 = | 8.34375E−03 | 8.02567E−03 | 3.10872E−02 | −7.61300E−03 | 4.54276E−02 |
| A8 = | −5.61055E−03 | −6.71462E−03 | −3.05136E−02 | 6.61852E−03 | −3.03070E−02 |
| A10 = | 2.84857E−04 | 2.22911E−03 | 1.12996E−02 | −1.00451E−02 | 1.68226E−02 |
| A12 = | 2.80938E−04 | 3.65430E−04 | 4.04056E−04 | 5.85395E−03 | 5.15313E−03 |
| A14 = | | | −1.51237E−03 | −1.38569E−03 | 7.32908E−04 |

| Surface # | 7 | 8 | 9 | 10 | 11 |
|---|---|---|---|---|---|
| k = | 5.00000E+00 | −1.00000E+00 | −2.00000E+01 | −1.81336E+00 | −2.64084E+00 |
| A4 = | −6.05532E−02 | −3.31666E−02 | 7.05646E−02 | 1.08256E−01 | 3.64798E−02 |
| A6 = | 3.34852E−02 | −9.51171E−03 | −2.15858E−02 | −8.36367E−02 | −2.74059E−02 |
| A8 = | −1.34686E−02 | 3.31767E−03 | 3.33997E−03 | 4.26491E−02 | 1.25566E−02 |
| A10 = | 3.88702E−03 | −1.20824E−03 | 1.47744E−04 | −1.53846E−02 | −3.97264E−03 |
| A12 = | −9.82442E−04 | −3.10412E−04 | 1.46196E−05 | 3.51820E−03 | 7.99145E−04 |
| A14 = | 1.59137E−04 | 1.45176E−04 | −2.35752E−05 | −3.75537E−04 | −6.73076E−05 |

| Surface # | 12 | 13 | 14 | 15 |
|---|---|---|---|---|
| k = | −1.00000E+00 | −7.56703E+00 | 4.58213E+00 | −6.57759E+00 |
| A4 = | −3.54952E−02 | −7.56976E−03 | −3.08613E−02 | −1.97875E−02 |
| A6 = | 1.35910E−02 | 1.70535E−04 | 2.61409E−03 | 2.87199E−03 |
| A8 = | −3.01045E−03 | 3.99191E−03 | 3.19026E−05 | −3.63595E−04 |
| A10 = | 3.53923E−04 | −1.30996E−03 | 3.18273E−05 | 2.74548E−05 |
| A12 = | −2.68548E−06 | 1.64130E−04 | 5.26362E−07 | −1.28243E−06 |
| A14 = | −3.00570E−06 | −7.49706E−06 | −4.90720E−07 | 2.72669E−08 |

In the image lens assembly system according to the 7th embodiment, the definitions of f, f12, f2, f4, f7, Fno, FOV, HFOV, V5, V6, R9, R10, R13, R14, ΣCT, T12, Td, TTL, and ImgH are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 5.15 | f7/f | −0.52 |
| Fno | 2.20 | f/f12 | 1.12 |
| HFOV (deg.) | 37.3 | f/f2 + f/f4 | 2.13 |
| V5/V6 | 0.41 | Td (mm) | 5.394 |
| T12/f | 0.021 | ΣCT/Td | 0.72 |
| |(R9 − R10)/(R9 + R10)| | 0.08 | TTL/ImgH | 1.70 |
| R14/|R13| | 0.11 | FOV (deg.) | 74.6 |

8th Embodiment

Figure 15:
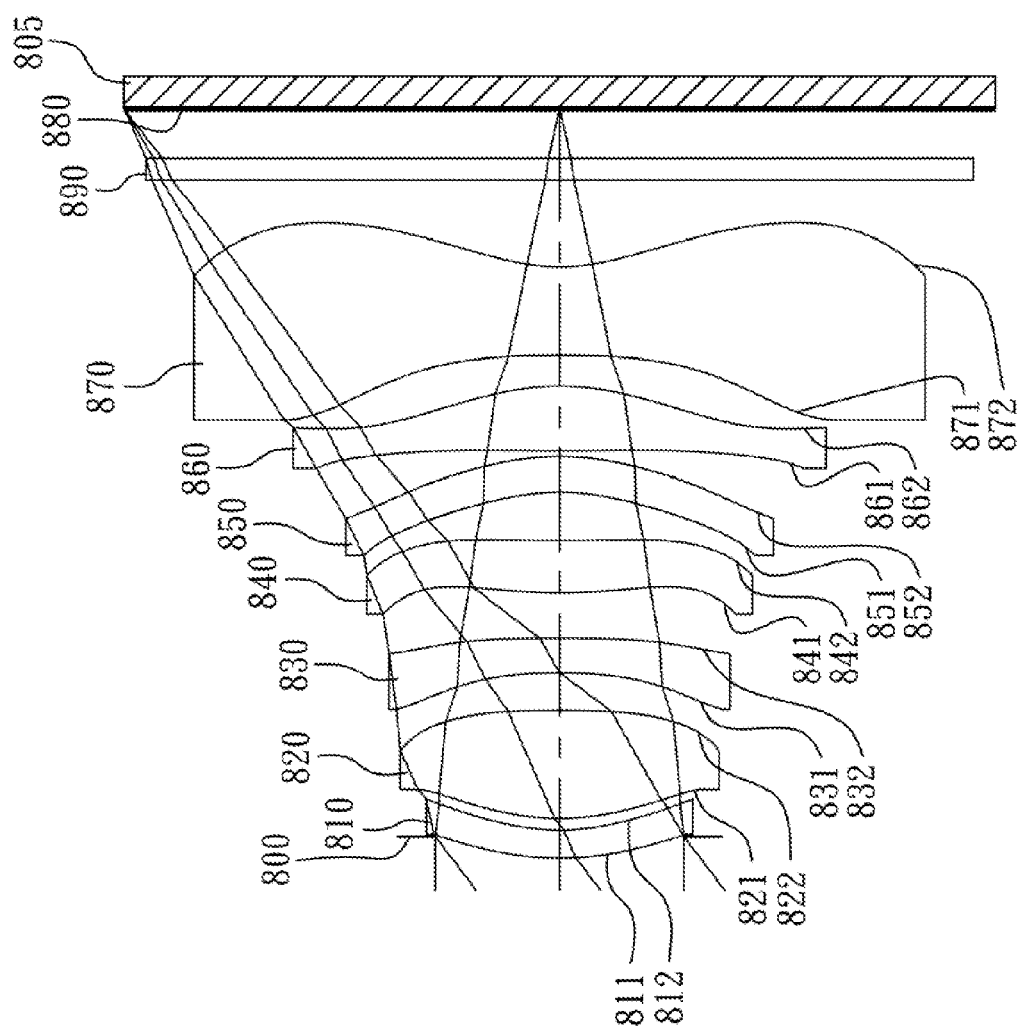
FIG. 15 is a schematic view of an image lens assembly system according to the 8th embodiment of the present disclosure.
Figure 16:
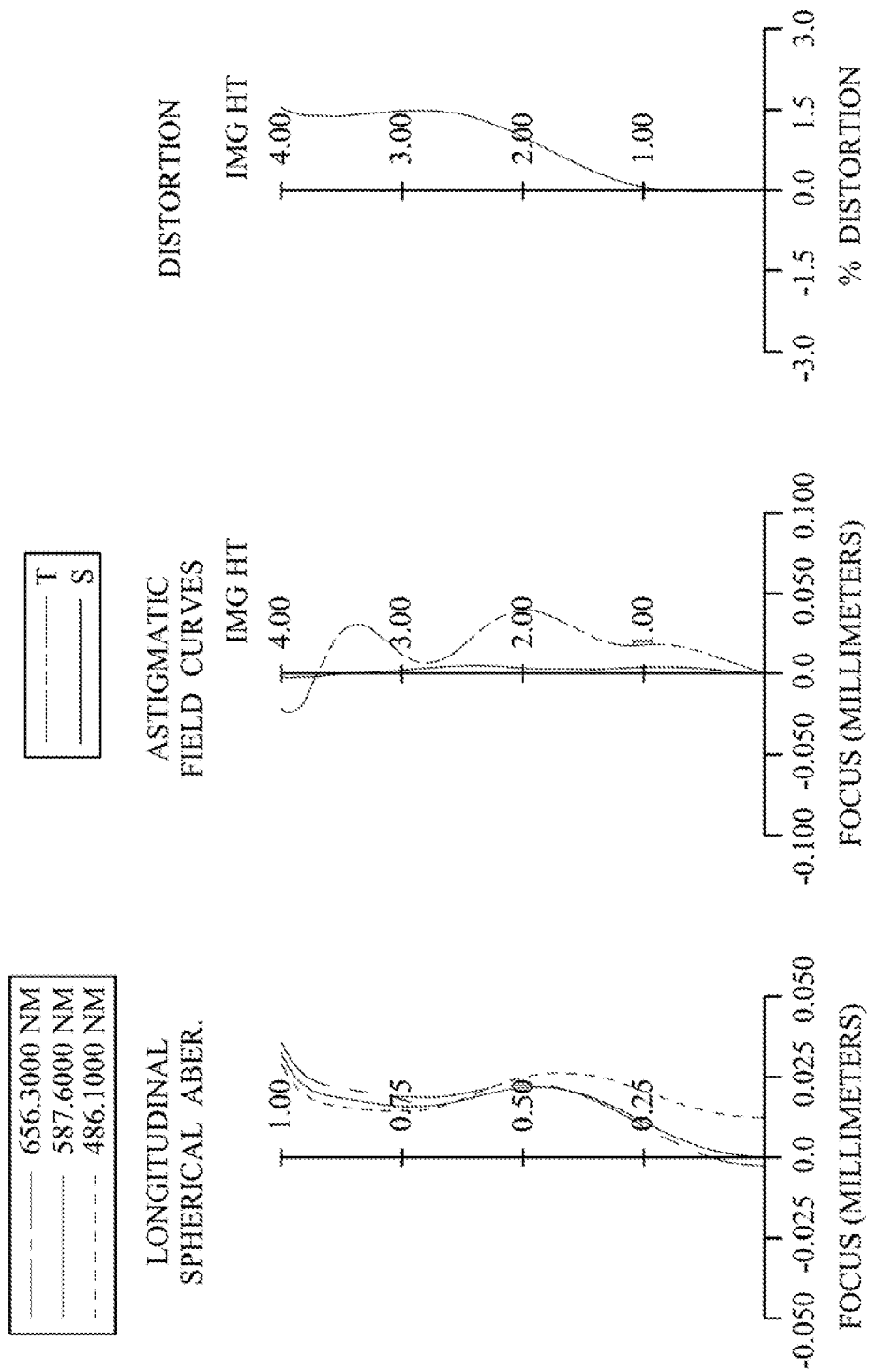
FIG. 16 shows spherical aberration curves, astigmatic field curves and a distortion curve of the image lens assembly system according to the 8th embodiment.

FIG. 15 is a schematic view of an image lens assembly system according to the 8th embodiment of the present disclosure. FIG. 16 shows spherical aberration curves, astigmatic field curves and a distortion curve of the image lens assembly system according to the 8th embodiment. In FIG. 15, the image lens assembly system includes, in order from an object side to an image side, an aperture stop 800, a first lens element 810, a second lens element 820, a third lens element 830, a fourth lens element 840, a fifth lens element 850, a sixth lens element 860, a seventh lens element 870, an IR-cut filter 890, an image plane 880, and an image sensor 805. The aperture stop 800 is located between an object and the first lens element 810 as a front stop.

The first lens element 810 made of plastic material has negative refractive power. The first lens element 810 has a convex object-side surface 811 and a concave image-side surface 812, and both the object-side surface 811 and the image-side surface 812 thereof are aspheric.

The second lens element 820 made of plastic material has positive refractive power. The second lens element 820 has a convex object-side surface 821 and a convex image-side surface 822, and both the object-side surface 821 and the image-side surface 822 thereof are aspheric.

The third lens element 830 made of plastic material has negative refractive power. The third lens element 830 has a concave object-side surface 831 changing from concave at a paraxial region to convex at a peripheral region, and has a convex image-side surface 832 changing from convex at a paraxial region to concave at a peripheral region. Both the object-side surface 831 and the image-side surface 832 of the third lens element 830 are aspheric.

The fourth lens element 840 made of plastic material has positive refractive power. The fourth lens element 840 has a convex object-side surface 841 changing from convex at a paraxial region to concave at a peripheral region, and has a concave image-side surface 842 changing from concave at a paraxial region to convex at a peripheral region. Both the object-side surface 841 and the image-side surface 842 of the fourth lens element 840 are aspheric.

The fifth lens element 850 made of plastic material has negative refractive power. The fifth lens element 850 has a concave object-side surface 851 and a convex image-side surface 852, and both the object-side surface 851 and the image-side surface 852 thereof are aspheric.

The sixth lens element 860 made of plastic material has positive refractive power. The sixth lens element 860 has a convex object-side surface 861 and a convex image-side surface 862, and both the object-side surface 861 and the image-side surface 862 thereof are aspheric.

The seventh lens element 870 made of plastic material has negative refractive power. The seventh lens element 870 has a concave object-side surface 871, and has a concave image-side surface 872 changing from concave at a paraxial region to convex at a peripheral region. Both the object-side surface 871 and the image-side surface 872 of the seventh lens element 870 are aspheric.

The IR-cut filter 890 made of glass material is located between the seventh lens element 870 and the image plane 880, and will not affect a focal length of the image lens assembly system.

The detailed optical data of the 8th embodiment are shown in Table 15, and the aspheric surface data are shown in Table 16 below.

TABLE 15

8th Embodiment
f = 5.25 mm, Fno = 2.30, HFOV = 36.8 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.200 | | | | |
| 2 | Lens 1 | 2.602310 | (ASP) | 0.260 | Plastic | 1.640 | 23.3 | −16.52 |
| 3 | | 2.006680 | (ASP) | 0.106 | | | | |
| 4 | Lens 2 | 2.201500 | (ASP) | 0.990 | Plastic | 1.535 | 56.3 | 3.53 |
| 5 | | −11.146300 | (ASP) | 0.346 | | | | |
| 6 | Lens 3 | −4.722800 | (ASP) | 0.321 | Plastic | 1.640 | 23.3 | −8.20 |
| 7 | | −48.549100 | (ASP) | 0.414 | | | | |
| 8 | Lens 4 | 4.933800 | (ASP) | 0.484 | Plastic | 1.544 | 55.9 | 10.80 |
| 9 | | 29.673600 | (ASP) | 0.446 | | | | |
| 10 | Lens 5 | −1.969800 | (ASP) | 0.325 | Plastic | 1.640 | 23.3 | −32.54 |
| 11 | | −2.315710 | (ASP) | 0.050 | | | | |
| 12 | Lens 6 | 20.014100 | (ASP) | 0.602 | Plastic | 1.535 | 56.3 | 3.67 |
| 13 | | −2.154160 | (ASP) | 0.280 | | | | |
| 14 | Lens 7 | −10.676300 | (ASP) | 0.815 | Plastic | 1.535 | 56.3 | −2.62 |
| 15 | | 1.657620 | (ASP) | 0.800 | | | | |
| 16 | IR-cut filter | Plano | | 0.200 | Glass | 1.516 | 64.1 | — |
| 17 | | Plano | | 0.452 | | | | |
| 18 | Image | Plano | | — | | | | |

Note:
Reference wavelength (d-line) is 587.6 nm.

TABLE 16

Aspheric Coefficients

| Surface # | 2 | 3 | 4 | 5 | 6 |
|---|---|---|---|---|---|
| k = | −6.87197E+00 | −7.05125E+00 | −4.21527E+00 | −1.00000E+00 | −1.50316E+01 |
| A4 = | 5.76444E−03 | 6.82854E−03 | −1.88124E−02 | −3.45663E−02 | −8.58122E−02 |

TABLE 16-continued

Aspheric Coefficients

| A6 = | 6.77836E−03 | 7.44529E−03 | 3.15585E−02 | −8.80378E−03 | 4.54720E−02 |
|---|---|---|---|---|---|
| A8 = | −5.79508E−03 | −7.97931E−03 | −2.97162E−02 | 8.07313E−03 | −2.90295E−02 |
| A10 = | 6.34620E−04 | 2.88554E−03 | 1.07777E−02 | −1.03488E−02 | 1.67409E−02 |
| A12 = | 2.80938E−04 | −3.65430E−04 | 4.04056E−04 | 5.76922E−03 | −5.10758E−03 |
| A14 = | | | −1.51237E−03 | −1.38569E−03 | 7.12025E−04 |

| Surface # | 7 | 8 | 9 | 10 | 11 |
|---|---|---|---|---|---|
| k = | −2.00000E+01 | −1.00000E+00 | −2.00000E+01 | −1.68151E+00 | −3.54191E+00 |
| A4 = | −6.16598E−02 | −3.80057E−02 | −1.07876E−02 | 1.08364E−01 | 3.49958E−02 |
| A6 = | 3.37248E−02 | −1.18302E−02 | −2.20889E−02 | −8.35851E−02 | −2.83550E−02 |
| A8 = | −1.34429E−02 | 2.88834E−03 | 3.73994E−03 | 4.22824E−02 | 1.24576E−02 |
| A10 = | 4.19445E−03 | −9.37494E−04 | 6.00516E−05 | −1.53970E−02 | −3.97761E−03 |
| A12 = | −9.36374E−04 | −3.00913E−04 | −1.46197E−06 | 3.52483E−03 | 7.91191E−04 |
| A14 = | 1.36346E−04 | 1.17673E−04 | −1.99974E−05 | −3.71131E−04 | −6.50600E−05 |

| Surface # | 12 | 13 | 14 | 15 |
|---|---|---|---|---|
| k = | −1.00000E+00 | −8.38180E+00 | −1.00000E+01 | −6.97864E+00 |
| A4 = | −3.35904E−02 | −7.29355E−03 | −2.91808E−02 | −1.83533E−02 |
| A6 = | 1.34242E−02 | −3.61728E−05 | 2.57097E−03 | 2.64594E−03 |
| A8 = | −3.19153E−03 | 3.98074E−03 | 2.85784E−05 | −3.47795E−04 |
| A10 = | 3.46155E−04 | −1.30863E−03 | 3.07096E−05 | 2.83190E−05 |
| A12 = | −7.73141E−07 | 1.64216E−04 | 4.61581E−07 | −1.42720E−06 |
| A14 = | −2.53248E−06 | −7.50878E−06 | −4.87540E−07 | 3.16084E−08 |

In the image lens assembly system according to the 8th embodiment, the definitions of f, f12, f2, f4, f7, Fno, FOV, HFOV, V5, V6, R9, R10, R13, R14, ΣCT, T12, Td, TTL, and ImgH are the same as those stated in the 1st embodiment with corresponding values for the 8th embodiment. Moreover, these parameters can be calculated from Table 15 and Table 16 as the following values and satisfy the following relationships:

| f (mm) | 5.25 | f7/f | −0.50 |
|---|---|---|---|
| Fno | 2.30 | f/f12 | 1.13 |
| HFOV (deg.) | 36.8 | f/f2 + f/f4 | 1.97 |
| V5/V6 | 0.41 | Td (mm) | 5.439 |
| T12/f | 0.020 | ΣCT/Td | 0.70 |
| |(R9 − R10)/(R9 + R10)| | 0.08 | TTL/ImgH | 1.71 |
| R14/|R13| | 0.16 | FOV (deg.) | 73.6 |

9th Embodiment

Figure 17:
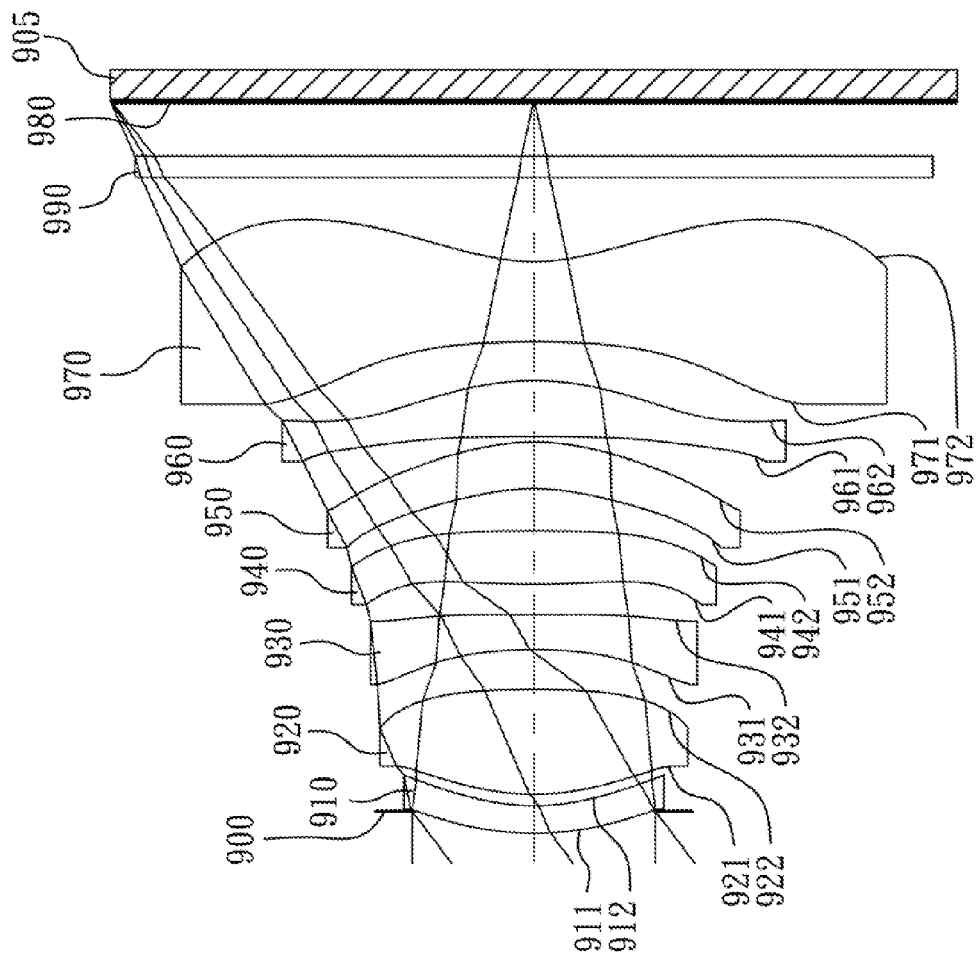
FIG. 17 is a schematic view of an image lens assembly system according to the 9th embodiment of the present disclosure.
Figure 18:
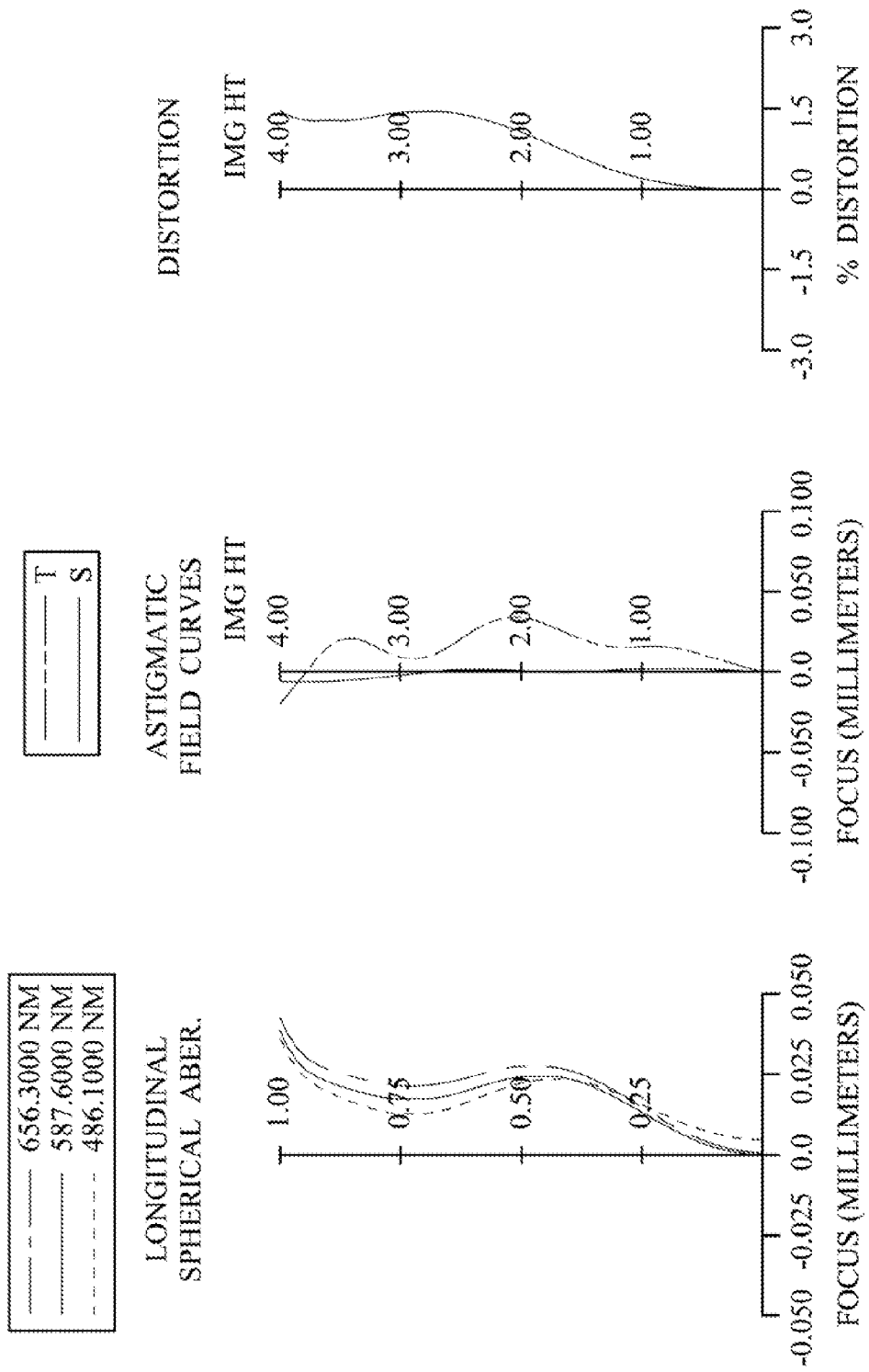
FIG. 18 shows spherical aberration curves, astigmatic field curves and a distortion curve of the image lens assembly system according to the 9th embodiment.

FIG. 17 is a schematic view of an image lens assembly system according to the 9th embodiment of the present disclosure. FIG. 18 shows spherical aberration curves, astigmatic field curves and a distortion curve of the image lens assembly system according to the 9th embodiment. In FIG. 17, the image lens assembly system includes, in order from an object side to an image side, an aperture stop 900, a first lens element 910, a second lens element 920, a third lens element 930, a fourth lens element 940, a fifth lens element 950, a sixth lens element 960, a seventh lens element 970, an IR-cut filter 990, an image plane 980, and an image sensor 905. The aperture stop 900 is located between an object and the first lens element 910 as a front stop.

The first lens element 910 made of plastic material has negative refractive power. The first lens element 910 has a convex object-side surface 911 and a concave image-side surface 912, and both the object-side surface 911 and the image-side surface 912 thereof are aspheric.

The second lens element 920 made of plastic material has positive refractive power. The second lens element 920 has a convex object-side surface 921 and a convex image-side surface 922, and both the object-side surface 921 and the image-side surface 922 thereof are aspheric.

The third lens element 930 made of plastic material has negative refractive power. The third lens element 930 has a concave object-side surface 931 changing from concave at a paraxial region to convex at a peripheral region, and has a concave image-side surface 932 changing from concave at a paraxial region to convex at a peripheral region. Both the object-side surface 931 and the image-side surface 932 of the third lens element 930 are aspheric.

The fourth lens element 940 made of plastic material has positive refractive power. The fourth lens element 940 has a convex object-side surface 941 changing from convex at a paraxial region to concave at a peripheral region, and has a convex image-side surface 942. Both the object-side surface 941 and the image-side surface 942 of the fourth lens element 940 are aspheric.

The fifth lens element 950 made of plastic material has positive refractive power. The fifth lens element 950 has a concave object-side surface 951 and a convex image-side surface 952, and both the object-side surface 951 and the image-side surface 952 thereof are aspheric.

The sixth lens element 960 made of plastic material has positive refractive power. The sixth lens element 960 has a concave object-side surface 961 and a convex image-side surface 962, and both the object-side surface 961 and the image-side surface 962 thereof are aspheric.

The seventh lens element 970 made of plastic material has negative refractive power. The seventh lens element 970 has a concave object-side surface 971, and has a concave image-side surface 972 changing from concave at a paraxial region to convex at a peripheral region. Both the object-side surface 971 and the image-side surface 972 of the seventh lens element 970 are aspheric.

The IR-cut filter 990 made of glass material is located between the seventh lens element 970 and the image plane 980, and will not affect a focal length of the image lens assembly system.

The detailed optical data of the 9th embodiment are shown in Table 17, and the aspheric surface data are shown in Table 18 below.

TABLE 17

9th Embodiment
f = 5.30 mm, Fno = 2.30, HFOV = 36.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 3 | Ape. Stop | Plano | | −0.213 | | | | |
| 1 | Lens 1 | 2.524870 | (ASP) | 0.266 | Plastic | 1.640 | 23.3 | −19.98 |
| 2 | | 2.021730 | (ASP) | 0.109 | | | | |
| 4 | Lens 2 | 2.273870 | (ASP) | 0.990 | Plastic | 1.544 | 55.9 | 3.55 |
| 5 | | −10.957200 | (ASP) | 0.375 | | | | |
| 6 | Lens 3 | −4.942700 | (ASP) | 0.335 | Plastic | 1.640 | 23.3 | −6.52 |
| 7 | | 27.457400 | (ASP) | 0.290 | | | | |
| 8 | Lens 4 | 7.891000 | (ASP) | 0.507 | Plastic | 1.544 | 55.9 | 8.74 |
| 9 | | −11.702700 | (ASP) | 0.397 | | | | |
| 10 | Lens 5 | −2.058580 | (ASP) | 0.439 | Plastic | 1.640 | 23.3 | 37.30 |
| 11 | | −2.052790 | (ASP) | 0.050 | | | | |
| 12 | Lens 6 | −87.684300 | (ASP) | 0.535 | Plastic | 1.535 | 56.3 | 4.95 |
| 13 | | −2.574080 | (ASP) | 0.365 | | | | |
| 14 | Lens 7 | −11.322400 | (ASP) | 0.762 | Plastic | 1.535 | 56.3 | −2.84 |
| 15 | | 1.794250 | (ASP) | 0.800 | | | | |
| 16 | IR-cut filter | Plano | | 0.200 | Glass | 1.516 | 64.1 | — |
| 17 | | Plano | | 0.518 | | | | |
| 18 | Image | Plano | | — | | | | |

Note:
Reference wavelength (d-line) is 587.6 nm.

TABLE 18

Aspheric Coefficients

| Surface | 2 | 3 | 4 | 5 | 6 |
|---|---|---|---|---|---|
| k = | −6.06567E+00 | −6.80506E+00 | −4.11270E+00 | −1.00000E+00 | −1.52317E+01 |
| A4 = | 6.80017E−03 | 8.41851E−03 | −1.84678E−02 | 3.52489E−02 | −8.81932E−02 |
| A6 = | 5.97603E−03 | 7.84999E−03 | 3.13319E−02 | −1.08428E−02 | 4.46724E−02 |
| A8 = | −5.00728E−03 | −7.80177E−03 | −2.81315E−02 | 1.01340E−02 | −2.85164E−02 |
| A10 = | 9.17729E−06 | 2.59215E−03 | 1.00096E−02 | −1.09824E−02 | 1.69255E−02 |
| A12 = | 3.34753E−04 | −4.20812E−04 | 5.31783E−04 | 5.70251E−03 | −5.13375E−03 |
| A14 = | | | −1.51237E−03 | −1.34121E−03 | 7.11682E−04 |

| Surface # | 7 | 8 | 9 | 10 | 11 |
|---|---|---|---|---|---|
| k = | −2.00000E+01 | −1.0000E4+00 | −2.00000E+01 | −1.71719E+00 | −4.19307E+00 |
| A4 = | −6.16177E−02 | −3.77505E−02 | 2.04709E−03 | 1.09432E−01 | 3.62964E−02 |
| A6 = | 3.41827E−02 | −1.00036E−02 | −2.12307E−02 | −8.36136E−02 | −2.92374E−02 |
| A8 = | −1.37313E−02 | 2.85817E−03 | 4.28102E−03 | 4.18768E−02 | 1.21572E−02 |
| A10 = | 4.18540E−03 | −7.66341E−04 | 8.70390E−05 | −1.54969E−02 | −3.99920E−03 |
| A12 = | −8.70722E−04 | −3.10377E−04 | −3.39780E−06 | 3.51972E−03 | 7.99213E−04 |
| A14 = | 1.46881E−04 | 1.35477E−04 | −2.10613E−05 | −3.60205E−04 | −6.28674E−05 |

| Surface # | 12 | 13 | 14 | 15 |
|---|---|---|---|---|
| k = | −1.00000E+00 | −4.58629E+00 | −1.00000E+01 | −6.28291E+00 |
| A4 = | 3.30987E−02 | −3.67583E−03 | −2.66690E−02 | −2.06644E−02 |
| A6 = | 1.41216E−02 | 6.29184E−07 | 2.51062E−03 | 3.14483E−03 |
| A8 = | −3.13984E−03 | 3.97852E−03 | −1.58549E−05 | −4.02074E−04 |
| A10 = | 3.41283E−04 | −1.30789E−03 | 2.54945E−05 | 3.11295E−05 |
| A12 = | −1.66064E−06 | 1.64122E−04 | 3.87881E−07 | −1.42081E−06 |
| A14 = | −3.15719E−06 | −7.62266E−06 | −3.84553E−07 | 2.73415E−08 |

In the image lens assembly system according to the 9th embodiment, the definitions of f, f12, f2, f4, f7, Fno, FOV, HFOV, V5, V6, R9, R10, R13, R14, ΣCT, T12, Td, TTL, and ImgH are the same as those stated in the 1st embodiment with corresponding values for the 9th embodiment. Moreover, these parameters can be calculated from Table 17 and Table 18 as the following values and satisfy the following relationships:

| | | | |
|---|---|---|---|
| f (mm) | 5.30 | f7/f | −0.54 |
| Fno | 2.30 | f/f12 | 1.18 |
| HFOV (deg.) | 36.6 | f/f2 + f/f4 | 2.10 |
| V5/V6 | 0.41 | Td (mm) | 5.420 |
| T12/f | 0.021 | ΣCT/Td | 0.71 |
| |(R9 − R10)/(R9 + R10)| | 0.00 | TTL/ImgH | 1.72 |
| R14/|R13| | 0.16 | FOV (deg.) | 73.2 |

10th Embodiment

Figure 19:
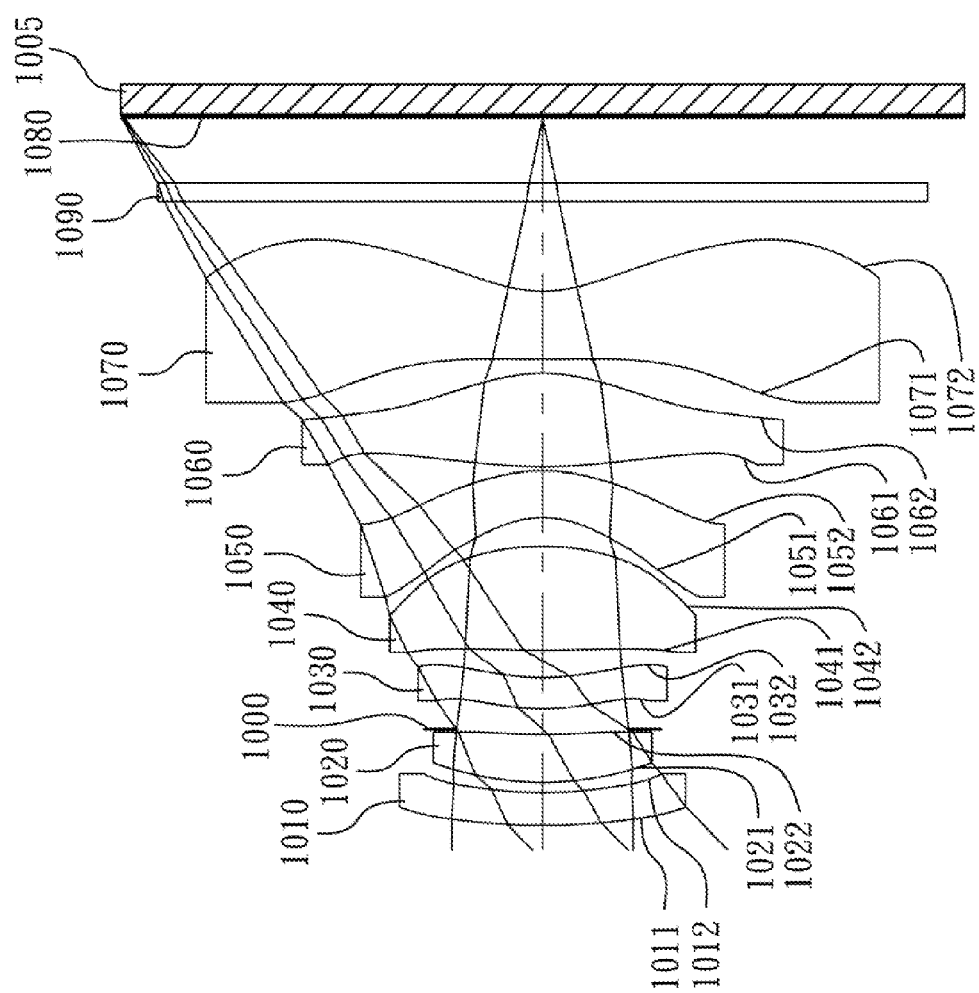
FIG. 19 is a schematic view of an image lens assembly system according to the 10th embodiment of the present disclosure.
Figure 20:
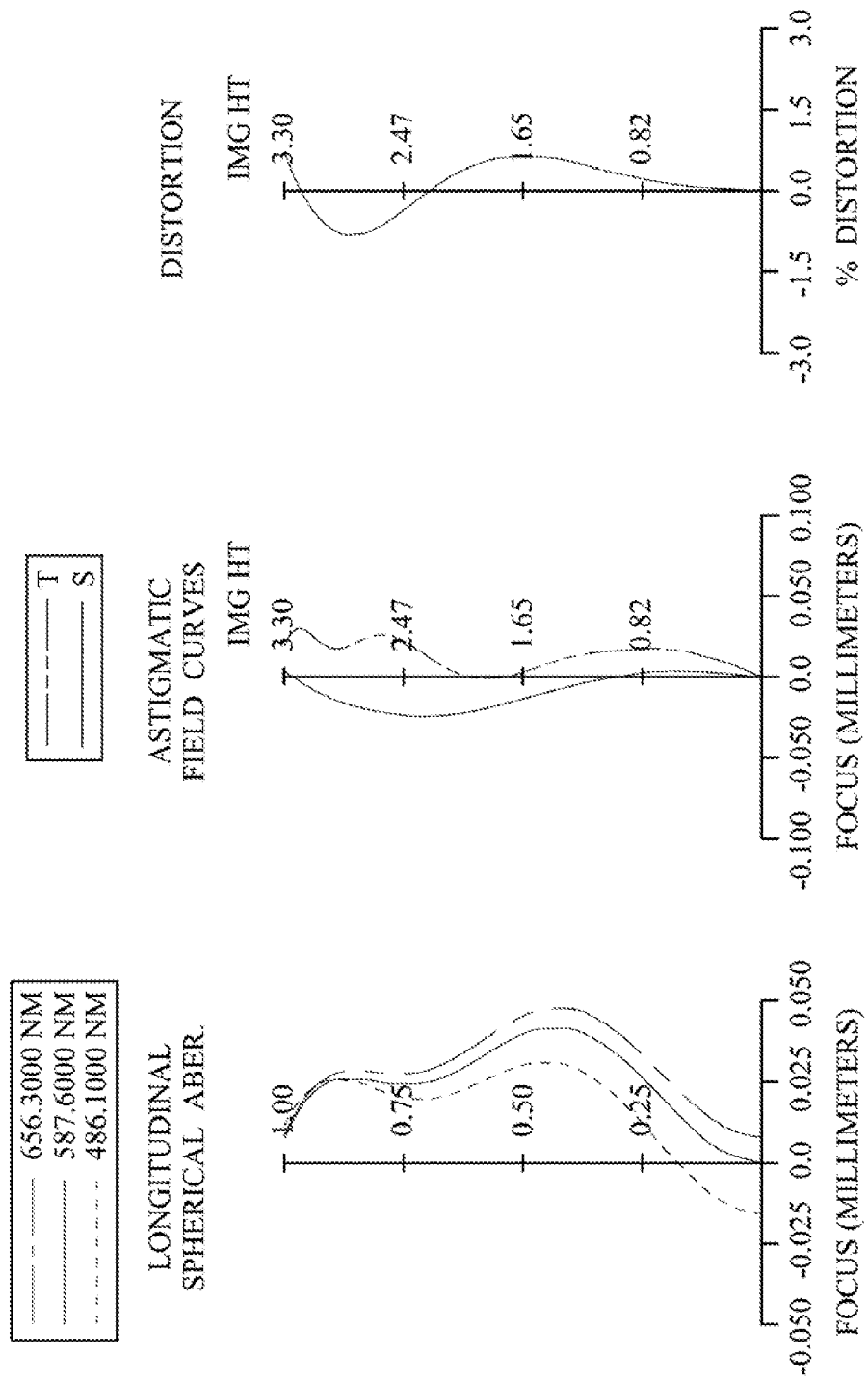
FIG. 20 shows spherical aberration curves, astigmatic field curves and a distortion curve of the image lens assembly system according to the 10th embodiment.

FIG. 19 is a schematic view of an image lens assembly system according to the 10th embodiment of the present disclosure. FIG. 20 shows spherical aberration curves, astigmatic field curves and a distortion curve of the image lens assembly system according to the 10th embodiment. In FIG. 19, the image lens assembly system includes, in order from an object side to an image side, a first lens element 1010, a second lens element 1020, an aperture stop 1000, a third lens element 1030, a fourth lens element 1040, a fifth lens element 1050, a sixth lens element 1060, a seventh lens element 1070, an IR-cut filter 1090, an image plane 1080, and an image sensor 1005.

The first lens element 1010 made of plastic material has negative refractive power. The first lens element 1010 has a convex object-side surface 1011 and a concave image-side surface 1012, and both the object-side surface 1011 and the image-side surface 1012 thereof are aspheric.

The second lens element 1020 made of plastic material has positive refractive power. The second lens element 1020 has a convex object-side surface 1021 and a concave image-side surface 1022, and both the object-side surface 1021 and the image-side surface 1022 thereof are aspheric.

The third lens element 1030 made of plastic material has positive refractive power. The third lens element 1030 has a convex object-side surface 1031 changing from convex at a paraxial region to concave at a peripheral region, and has a concave image-side surface 1032 changing from concave at a paraxial region to convex at a peripheral region. Both the object-side surface 1031 and the image-side surface 1032 of the third lens element 1030 are aspheric.

The fourth lens element 1040 made of plastic material has positive refractive power. The fourth lens element 1040 has a convex object-side surface 1041 changing from convex at a paraxial region to concave at a peripheral region, and has a convex image-side surface 1042 changing from convex at a paraxial region to concave at a peripheral region. Both the object-side surface 1041 and the image-side surface 1042 of the fourth lens element 1040 are aspheric.

The fifth lens element 1050 made of plastic material has negative refractive power. The fifth lens element 1050 has a concave object-side surface 1051 and a convex image-side surface 1052, and both the object-side surface 1051 and the image-side surface 1052 thereof are aspheric.

The sixth lens element 1060 made of plastic material has positive refractive power. The sixth lens element 1060 has a convex object-side surface 1061 and a convex image-side surface 1062, and both the object-side surface 1061 and the image-side surface 1062 thereof are aspheric.

The seventh lens element 1070 made of plastic material has negative refractive power. The seventh lens element 1070 has a convex object-side surface 1071, and has a concave image-side surface 1072 changing from concave at a paraxial region to convex at a peripheral region. Both the object-side surface 1071 and the image-side surface 1072 of the seventh lens element 1070 are aspheric.

The IR-cut filter 1090 made of glass material is located between the seventh lens element 1070 and the image plane 1080, and will not affect a focal length of the image lens assembly system.

The detailed optical data of the 10th embodiment are shown in Table 19, and the aspheric surface data are shown in Table 20 below.

TABLE 19

10th Embodiment
f = 3.41 mm, Fno = 2.40, HFOV = 43.7 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 4.882900 | (ASP) | 0.257 | Plastic | 1.544 | 55.9 | −15.83 |
| 2 | | 3.058300 | (ASP) | 0.080 | | | | |
| 3 | Lens 2 | 2.222640 | (ASP) | 0.378 | Plastic | 1.544 | 55.9 | 6.29 |
| 4 | | 5.952700 | (ASP) | 0.038 | | | | |
| 5 | Ape. Stop | Plano | | 0.163 | | | | |
| 6 | Lens 3 | 1.854800 | (ASP) | 0.240 | Plastic | 1.634 | 23.8 | 61.33 |
| 7 | | 1.849920 | (ASP) | 0.218 | | | | |
| 8 | Lens 4 | 11.291600 | (ASP) | 0.812 | Plastic | 1.544 | 55.9 | 3.23 |
| 9 | | −2.030110 | (ASP) | 0.229 | | | | |
| 10 | Lens 5 | −0.773830 | (ASP) | 0.366 | Plastic | 1.634 | 23.8 | −3.39 |
| 11 | | −1.431240 | (ASP) | 0.030 | | | | |
| 12 | Lens 6 | 3.498100 | (ASP) | 0.738 | Plastic | 1.530 | 55.8 | 1.83 |
| 13 | | −1.247730 | (ASP) | 0.110 | | | | |
| 14 | Lens 7 | 20.925200 | (ASP) | 0.533 | Plastic | 1.530 | 55.8 | −1.92 |
| 15 | | 0.964130 | (ASP) | 0.700 | | | | |
| 16 | IR-cut fifter | Plano | | 0.150 | Glass | 1.516 | 64.1 | — |
| 17 | | Plano | | 0.525 | | | | |
| 18 | Image | Plano | | — | | | | |

Note:
Reference wavelength (d-line) is 5873 nm.

TABLE 20

Aspheric Coefficients

| Surface # | 1 | 2 | 3 | 4 | 6 |
|---|---|---|---|---|---|
| k = | −3.57950E+00 | −1.18187E+01 | −5.83058E+00 | −2.00000E+01 | −5.95059E+00 |
| A4 = | −1.15879E−02 | −2.48454E−02 | −1.87504E−02 | −9.59097E−02 | −1.75350E−01 |
| A6 = | −1.15791E−03 | 3.51250E−02 | 1.55456E−01 | 2.99677E−02 | 1.56379E−01 |

TABLE 20-continued

Aspheric Coefficients

| | | | | | |
|---|---|---|---|---|---|
| A8 = | 8.36407E−03 | −3.48093E−02 | −3.62650E−01 | 8.73180E−02 | −3.93096E−01 |
| A10 = | 1.03746E−02 | 9.68860E−02 | 2.92472E−01 | −2.55241E−01 | 2.68545E−01 |
| A12 = | −3.15757E−03 | −7.51579E−08 | 3.32816E−01 | 1.09875E−01 | 2.35814E−03 |
| A14 = | | | −4.27632E−01 | −4.04522E−02 | −2.26124E−01 |

| Surface # | 7 | 8 | 9 | 10 | 11 |
|---|---|---|---|---|---|
| k = | −2.85888E+00 | −7.52580E+00 | 3.98278E−01 | −1.46248E+00 | −1.78164E+00 |
| A4 = | −1.64415E−01 | −4.51427E−02 | −3.54970E−02 | 2.25983E−01 | 8.44047E−02 |
| A6 = | 8.82861E−02 | −1.29082E−02 | −4.34760E−02 | −3.80811E−01 | −1.14822E−01 |
| A8 = | −1.15832E−03 | 3.55455E−02 | 9.87332E−03 | 3.61099E−01 | 1.05642E−01 |
| A10 = | 4.99876E−02 | −2.82721E−02 | −3.04876E−03 | −2.09491E−01 | −5.63719E−02 |
| A12 = | −2.03570E−02 | −1.75580E−02 | 3.84665E−03 | 9.72259E−02 | 2.07897E−02 |
| A14 = | −5.77218E−03 | 1.71898E−02 | 1.28611E−03 | −2.35294E−02 | −3.54294E−03 |

| Surface # | 12 | 13 | 14 | 15 |
|---|---|---|---|---|
| k = | −2.12199E+00 | −6.66059E+00 | −1.00000E+00 | −5.48675E+00 |
| A4 = | −1.03624E−01 | 1.59413E−02 | −8.44815E−02 | −4.46670E−02 |
| A6 = | 6.88251E−02 | −1.36101E−02 | 1.98136E−02 | 1.11491E−02 |
| A8 = | −2.58817E−02 | 3.25223E−02 | −2.04402E−03 | −2.16933E−03 |
| A10 = | 3.94339E−03 | −1.90465E−02 | 1.55735E−04 | 2.27480E−04 |
| A12 = | −3.72738E−04 | 4.36017E−03 | 3.26989E−05 | −1.19224E−05 |
| A14 = | 2.60813E−05 | −3.53230E−04 | −7.30170E−06 | 2.42933E−07 |

In the image lens assembly system according to the 10th embodiment, the definitions of f, f12, f2, f4, f7, Fno, FOV, HFOV, V5, V6, R9, R10, R13, R14, ΣCT, T12, Td, TTL, and ImgH are the same as those stated in the 1st embodiment with corresponding values for the 10th embodiment. Moreover, these parameters can be calculated from Table 19 and Table 20 as the following values and satisfy the following relationships:

| | | | |
|---|---|---|---|
| f (mm) | 3.41 | f7/f | −0.56 |
| Fno | 2.40 | f/f12 | 0.31 |
| HFOV (deg.) | 43.7 | f/f2 + f/f4 | 1.60 |
| V5/V6 | 0.43 | Td (mm) | 4.192 |
| T12/f | 0.023 | ΣCT/Td | 0.79 |
| |(R9 − R10)/(R9 + R10)| | 0.30 | TTL/ImgH | 1.67 |
| R14/|R13| | 0.05 | FOV (deg.) | 87.4 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image lens assembly system comprising, in order from an object side to an image side:
    a first lens element with negative refractive power having a convex object-side surface;
    a second lens element having positive refractive power;
    a third lens element having refractive power;
    a fourth lens element having refractive power;
    a fifth lens element having refractive power;
    a sixth lens element with positive refractive power made of plastic material, wherein at least one of an object-side surface and an image-side surface of the sixth lens element is aspheric; and
    a seventh lens element with negative refractive power made of plastic material having a concave image-side surface, wherein the image-side surface changes from concave at a paraxial region to convex at a peripheral region, and at least one of an object-side surface and the image-side surface thereof is aspheric;
    wherein a focal length of the image lens assembly system is f, a composite focal length of the first lens element and the second lens element is f12, a sum of central thicknesses from the first through seventh lens elements is ΣCT, an axial distance between the object-side surface of the first lens element and the image-side surface of the seventh lens element is Td, and the following relationships are satisfied:

$0.60 < \Sigma CT/Td < 0.90$; and $0.1 < f/f12 < 1.8$.

2. The image lens assembly system of claim 1, wherein the image-side surface of the sixth lens element is convex.

3. The image lens assembly system of claim 2, wherein the second lens element has a convex object-side surface.

4. The image lens assembly system of claim 3, wherein the sum of the central thicknesses from the first through seventh lens elements is ΣCT, the axial distance between the object-side surface of the first lens element and the image-side surface of the seventh lens element is Td, and the following relationship is satisfied:

$0.70 \leq \Sigma CT/Td < 0.90$.

5. The image lens assembly system of claim 3, wherein the focal length of the image lens assembly system is f, the composite focal length of the first lens element and the second lens element is f12, and the following relationship is satisfied:

$0.50 < f/f12 < 1.35$.

6. The image lens assembly system of claim 3, wherein at least one of the third lens element and the fourth lens element has at least one surface changing from concave to convex or changing from convex to concave at a paraxial region to a peripheral region.

7. The image lens assembly system of claim 3, wherein the axial distance between the object-side surface of the first lens element and the image-side surface of the seventh lens element is Td, and the following relationship is satisfied:

$3.2 \text{ mm} < Td < 7.0 \text{ mm}$.

8. The image lens assembly system of claim 7, wherein a curvature radius of an object-side surface of the fifth lens element is R9, a curvature radius of an image-side surface of the fifth lens element is R10, and the following relationship is satisfied:

$|(R9-R10)/(R9+R10)|<0.35$.

9. The image lens assembly system of claim 3, wherein an Abbe number of the fifth lens element is V5, an Abbe number of the sixth lens element is V6, and the following relationship is satisfied:

$0.25<V5/V6<0.60$.

10. The image lens assembly system of claim 3, wherein the focal length of the image lens assembly system is f, a focal length of the seventh lens element is f7, and the following relationship is satisfied:

$-0.70<f7/f<-0.30$.

11. The image lens assembly system of claim 3, wherein a curvature radius of the object-side surface of the seventh lens element is R13, a curvature radius of the image-side surface of the seventh lens element is R14, and the following relationship is satisfied:

$0<R14/|R13|<0.5$.

12. The image lens assembly system of claim 3, wherein the fourth lens element has positive refractive power.

13. The image lens assembly system of claim 3, wherein a maximal field of view of the image lens assembly system is FOV, and the following relationship is satisfied:

70 degrees<FOV<100 degrees.

14. The image lens assembly system of claim 3, wherein the focal length of the image lens assembly system is f, an axial distance between an image-side surface of the first lens element and the object-side surface of the second lens element is T12, and the following relationship is satisfied:

$0<T12/f<0.1$.

15. The image lens assembly system of claim 3, wherein the focal length of the image lens assembly system is f, a focal length of the second lens element is f2, a focal length of the fourth lens element is f4, and the following relationship is satisfied:

$1.4<f/f2+f/f4<2.6$.

16. The image lens assembly system of claim 3, wherein the focal length of the image lens assembly system is f, a focal length of the first lens element is f1, a focal length of the second lens element is f2, a focal length of the third lens element is f3, a focal length of the fourth lens element is f4, a focal length of the fifth lens element is f5, and the following relationship is satisfied:

$|f/f2|>f/fi$, wherein $i=1, 3, 4, 5$.

17. An image lens assembly system comprising, in order from an object side to an image side:
to a first lens element with negative refractive power having a convex object-side surface;
a second lens element having positive refractive power;
a third lens element having refractive power;
a fourth lens element having refractive power;
a fifth lens element with refractive power having a concave object-side surface and a convex image-side surface;
a sixth lens element with positive refractive power made of plastic material, wherein at least one of an object-side surface and an image-side surface of the sixth lens element is aspheric; and
a seventh lens element with negative refractive power made of plastic material having a concave image-side surface, wherein the image-side surface changes from concave at a paraxial region to convex at a peripheral region, and at least one of an object-side surface and the image-side surface thereof is aspheric;
wherein a focal length of the image lens assembly system is f, a composite focal length of the first lens element and the second lens element is f12, and the following relationship is satisfied:

$0.1<f/f12<1.8$.

18. The image lens assembly system of claim 17, wherein an axial distance between the object-side surface of the first lens element and an image plane is TTL, a maximum image height of the image lens assembly system is ImgH, and the following relationship is satisfied:

TTL/ImgH<1.85.

19. The image lens assembly system of claim 18, wherein the second lens element has a convex object-side surface, and the image-side surface of the sixth lens element is convex.

20. The image lens assembly system of claim 19, wherein a curvature radius of the object-side surface of the seventh lens element is R13, a curvature radius of the image-side surface of the seventh lens element is R14, and the following relationship is satisfied:

$0<R14/|R13|<0.5$.

21. The image lens assembly system of claim 19, wherein the focal length of the image lens assembly system is f, a focal length of the seventh lens element is f7, and the following relationship is satisfied:

$-0.70<f7/f<-0.30$.

22. The image lens assembly system of claim 18, wherein at least one of the third lens element and the fourth lens element has at least one surface changing from concave to convex or changing from convex to concave at a paraxial region to a peripheral region.

23. The image lens assembly system of claim 18, wherein a sum of central thicknesses from the first through seventh lens elements is ΣCT, an axial distance between the object-side surface of the first lens element and the image-side surface of the seventh lens element is Td, and the following relationship is satisfied:

$0.60<\Sigma CT/Td<0.90$.

24. The image lens assembly system of claim 17, wherein the focal length of the image lens assembly system is f, a focal length of the first lens element is f1, a focal length of the second lens element is f2, a focal length of the third lens element is f3, a focal length of the fourth lens element is f4, a focal length of the fifth lens element is f5, and the following relationship is satisfied:

$|f/f2|>f/fi$, wherein $i=1, 3, 4, 5$.

25. The image lens assembly system of claim 24, wherein the fourth lens element has positive refractive power.

26. The image lens assembly system of claim 24, wherein an Abbe number of the fifth lens element is V5, an Abbe number of the sixth lens element is V6, and the following relationship is satisfied:

$$0.25 < V5/V6 < 0.60.$$

27. The image lens assembly system of claim 24, wherein a curvature radius of the object-side surface of the fifth lens element is R9, a curvature radius of the image-side surface of the fifth lens element is R10, and the following relationship is satisfied:

$$|(R9-R10)/(R9+R10)| < 0.35.$$

* * * * *

UNITED STATES PATENT AND TRADEMARK OFFICE
CERTIFICATE OF CORRECTION

PATENT NO. : 8,736,979 B2  
APPLICATION NO. : 13/671540  
DATED : May 27, 2014  
INVENTOR(S) : Tsai et al.

Page 1 of 1

It is certified that error appears in the above-identified patent and that said Letters Patent is hereby corrected as shown below:

In the Claims

Column 39, Claim 17, line 61, "to a" should read --a--.

Signed and Sealed this
Thirtieth Day of September, 2014

Michelle K. Lee
*Deputy Director of the United States Patent and Trademark Office*